United States Patent
Venugopal et al.

(10) Patent No.: US 11,818,069 B2
(45) Date of Patent: Nov. 14, 2023

(54) SELECTION OF INFORMATION FOR INCLUSION WITH GROUP-BASED REPORTING

(71) Applicant: QUALCOMM Incorporated, San Diego, CA (US)

(72) Inventors: Kiran Venugopal, Raritan, NJ (US); Yan Zhou, San Diego, CA (US); Wooseok Nam, San Diego, CA (US); Sungwoo Park, Seoul (KR); Tianyang Bai, Somerville, NJ (US); Mostafa Khoshnevisan, San Diego, CA (US); Junyi Li, Chester, NJ (US); Tao Luo, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 17/125,886

(22) Filed: Dec. 17, 2020

(65) Prior Publication Data

US 2021/0194658 A1 Jun. 24, 2021

Related U.S. Application Data

(60) Provisional application No. 62/951,927, filed on Dec. 20, 2019.

(51) Int. Cl.
*H04L 5/00* (2006.01)
*H04B 7/06* (2006.01)
(Continued)

(52) U.S. Cl.
CPC ......... *H04L 5/0053* (2013.01); *H04B 7/0626* (2013.01); *H04B 7/0695* (2013.01);
(Continued)

(58) Field of Classification Search
CPC ... H04L 5/0053; H04L 1/0026; H04B 17/309; H04B 7/0626; H04B 7/0695; H04B 7/0857; H04W 76/27
(Continued)

(56) References Cited

U.S. PATENT DOCUMENTS

2017/0366311 A1* 12/2017 Iyer .................. H04L 5/0007
2019/0174346 A1*  6/2019 Murray ............... H04B 7/0408
(Continued)

FOREIGN PATENT DOCUMENTS

WO    WO-2019215288 A1 * 11/2019 ............... H04L 5/14

OTHER PUBLICATIONS

Ericsson: "On Group-Based Reporting of Tx Beams", 3GPP Draft, R1-1702675, 3GPP TSG-RAN WG1 #88, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 13, 2017-Feb. 17, 2017, Feb. 12, 2017 (Feb. 12, 2017), XP051209822, pp. 1-5, Retrieved from the Internet: URL: http://www.3gpp.org/ftp/Meetings_3GPP_SYNC/RAN1/Docs/ [retrieved on Feb. 12, 2017] p. 1/1, Line 39, Paragraph 1—Line 40 p. 2/1, Lines 4-17, Paragraph 2 p. 3/1, Line 7-Line 11.
(Continued)

*Primary Examiner* — Rownak Islam
(74) *Attorney, Agent, or Firm* — Arent Fox LLP /Qualcomm Incorporated

(57) ABSTRACT

A UE configured to report resources, such as beams, to a base station may be unaware of the context or purpose for which the UE is reporting such resources. As different resources may provide different performance and/or quality when used in different contexts, the resources reported by the UE may provide lower quality and/or performance in one context relative to some other unreported resources. In order to improve resource reporting by the UE, the UE may
(Continued)

be informed of an operational mode and/or a criteria based upon which the UE may select resources to report. The UE may report such selected resources to the base station in a group-based beam report. The base station may then configure communication with the UE based on the reported resources.

25 Claims, 9 Drawing Sheets

(51) Int. Cl.
  *H04B 7/08* (2006.01)
  *H04W 76/27* (2018.01)
  *H04L 1/00* (2006.01)
  *H04B 17/309* (2015.01)

(52) U.S. Cl.
  CPC ......... *H04B 7/0857* (2013.01); *H04B 17/309* (2015.01); *H04L 1/0026* (2013.01); *H04W 76/27* (2018.02)

(58) Field of Classification Search
  USPC .......................................................... 370/329
  See application file for complete search history.

(56) References Cited

U.S. PATENT DOCUMENTS

| | | | |
|---|---|---|---|
| 2019/0181941 A1* | 6/2019 | Kim | H04W 72/042 |
| 2019/0190582 A1 | 6/2019 | Guo et al. | |
| 2020/0107265 A1* | 4/2020 | Hwang | H04W 72/14 |
| 2020/0314881 A1* | 10/2020 | Bagheri | H04L 5/0051 |
| 2021/0153085 A1* | 5/2021 | Rahman | H04W 36/0058 |

OTHER PUBLICATIONS

International Search Report and Written Opinion—PCT/US2020/066234—ISA/EPO—dated Apr. 22, 2021.

* cited by examiner

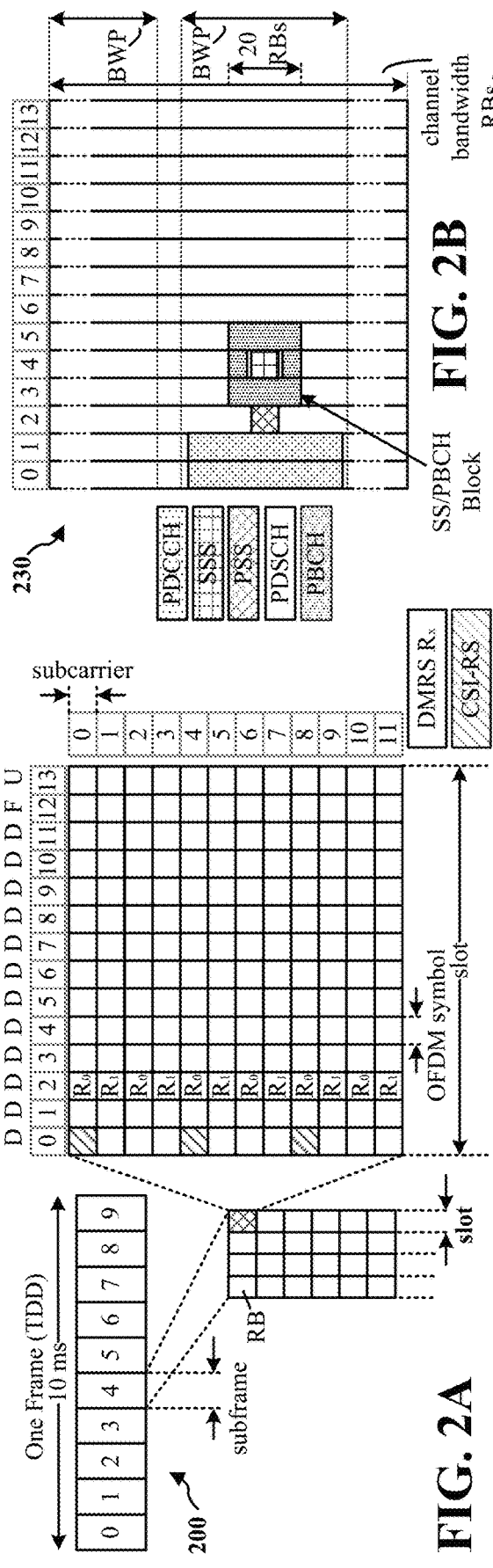
FIG. 2A
FIG. 2B
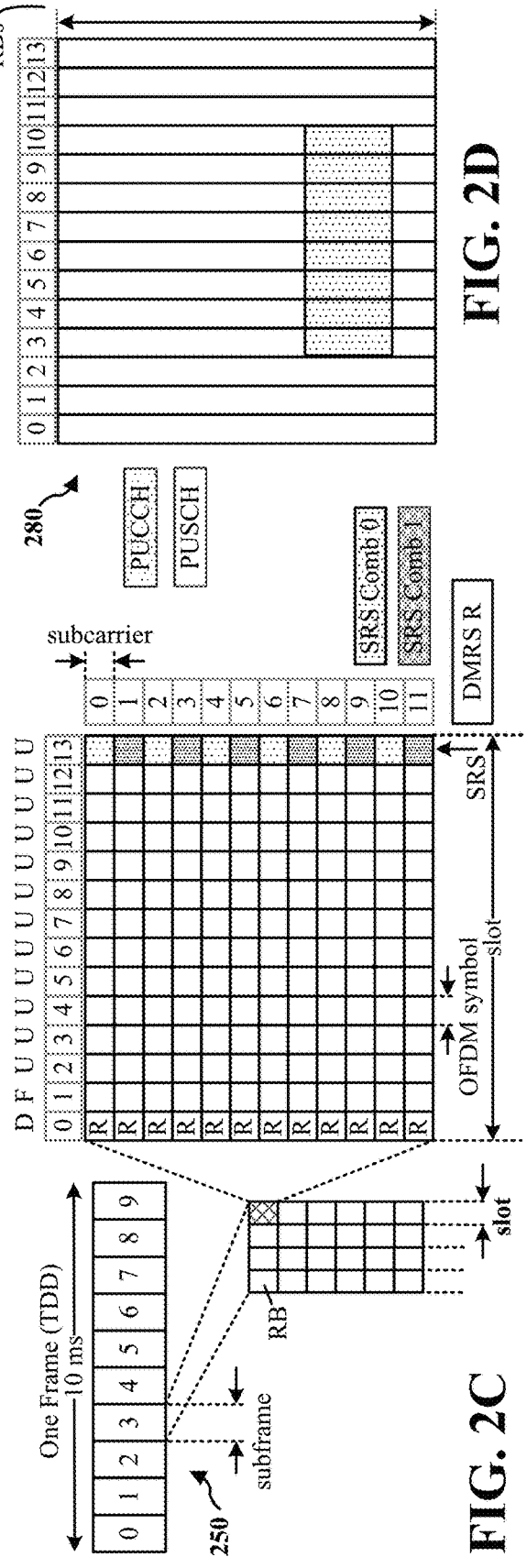
FIG. 2C
FIG. 2D

SELECTION OF INFORMATION FOR INCLUSION WITH GROUP-BASED REPORTING

CROSS REFERENCE TO RELATED APPLICATION(S)

This application claims the benefit of U.S. Provisional Application Ser. No. 62/951,927, entitled "ENHANCED GROUP BASED BEAM REPORTING" and filed on Dec. 20, 2019, the disclosure of which is expressly incorporated by reference herein in its entirety.

BACKGROUND

Technical Field

The present disclosure generally relates to communication systems, and more particularly, to beam management for communication between a base station and user equipment.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine-type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various wireless communications networks, such as access networks of 5G New Radio (NR), may provide for communication between a base station and a user equipment (UE) in a millimeter-wave (mmW) frequency spectrum (e.g., potentially including some near-mmW ranges). Thus, the base station and the UE may be configured for beamformed communication that uses directional beams. For example, a beam-pair link may be established between the base station and the UE that includes a transmit beam of the base station paired with a receive beam of the UE, or vice versa.

In order to improve link performance (e.g., reliability, low latency, etc.) and/or increase throughput, beamformed communication between a base station and a UE may include multi-beam transmission and reception, which may be simultaneous. For example, two or more transmit beams of the base station may be correspondingly paired with two or more receive beams of the UE (or vice versa) for simultaneous transmission/reception. Multi-beam transmission/reception may provide macro-diversity and/or increase throughput rates (e.g., relative to communication on a single beam-pair link), e.g., for multiple-input multiple-output (MIMO) communication.

Multi-beam transmission/reception may be configured by a base station for a channel (e.g., a joint channel) between the base station and the UE. For example, the UE may be configured to use one or more spatial filters, such as multiple simultaneous spatial filters. The base station may rely on some measurement information provided by the UE in order to configure such multi-beam transmission/reception. For example, the UE may be configured to provide one or more individual measurements for one or more transmit/receive beam pairs.

For simultaneous transmission/reception with joint quasi-colocation (QCL) on a data channel, the base station may configure the UE for group-based beam reporting, in which the UE reports up to two different resource indicators (RI) per report setting, with each RI corresponding to a transmit beam of the base station paired with a receive beam of the UE. For example, an RI may include a channel state information (CSI) reference signal (CSI-RS) RI (e.g., referred to as a CRI) for reporting based on respective CSI-RSs received on beams and/or a synchronization signal block (SSB) RI (e.g., referred to as an SSBRI) for reporting based on respective SSBs received on beams. CSI-RS resources and/or SSB resources may be simultaneously received by the UE, e.g., with either a single beam or with multiple simultaneous beams.

With group-based beam reporting, the UE may report a representative beam (e.g., one CRI and/or SSBRI) having at least one measurement value that is comparatively the "best" (e.g., highest, largest, etc.) relative to other measurement values corresponding to other beams. For example, the UE may report a layer 1 (L1) reference signal receive power (RSRP) value and/or L1 signal-to-interference-plus-noise (SINR) value measured from at least one CSI-RS and/or SSB received on the representative beam. In some aspects, the UE may use up to a first number of bits (e.g., seven bits) to report the measurement value corresponding to the representative beam.

In addition, the UE may report at least one other beam (e.g., another CRI and/or SSBRI) having at least one measurement value that is comparatively "better" (e.g., higher, larger, etc.) relative to other measurement values corresponding to other beams, except for the best measurement value corresponding to the representative beam. For example, the UE may report another RSRP value measured from another CSI-RS and/or SSB received on another beam, with the other RSRP value being comparatively better than other RSRP values measured for other beams but not better than the RSRP value measured for the representative beam.

In some aspects, the UE may use up to a first number of bits (e.g., seven bits) to report the measurement value corresponding to the representative beam. For example, the first number of bits may indicate the RSRP value corresponding to the representative beam, which may be the best RSRP value of all RSRP values corresponding to beams via which the UE receives CSI-RSs and/or SSBs measured by the UE to obtain the RSRP values. However, the UE may use a second number of bits (e.g., four bits), that is less than the first number of bits, to report at least one other measurement value corresponding to at least one other beam different from the representative beam. The second number of bits may be used to indicate a differential measurement value (e.g., differential RSRP), e.g., relative to the measurement value corresponding to the representative beam (and conveyed using the first number of bits).

Illustratively, a differential measurement value may indicate a difference between the measurement value corresponding to the other beam and the best measurement value corresponding to the representative beam. A differential measurement value may be conveyed using a fewer number of bits (e.g., four bits) than the best measurement value (e.g., conveyed using seven bits). In some aspects, the differential measurement value may be conveyed as a number of intervals (e.g., increments, steps, etc.) less than the best measurement value. For example, if the best measurement value is −50 decibel-milliwatts (dBm), the other (e.g., next best) measurement value is −60 dBm, and the interval amount (e.g., step size) is 2 dBm, then the differential measurement value for the other beam may be reported by the UE as 5, as −50 dBm−(2 dBm)(5)=−50−10 dBm=−60 dBm.

The grouping of beams (e.g., based on CRIs and/or SSBRIs) and the measurements associated therewith (e.g., corresponding RSRP and/or SINR values) may be intended to be used for simultaneous transmission/reception with joint QCL on a data channel. For example, a UE configured to transmit a group-based beam report for a group of n beams that individually identifies each of the n beams (e.g., via a respective CRI and/or SSBRI) and indicates at least one respective measurement value (e.g., RSRP and/or SINR values) corresponding to each of the n beams. In other words, group-based beam reporting may identify a group of beams, each of which may be selected by the UE for the group based on a respective individual quality of each of those beams, such as when used as an individual link, for pair-wise SISO, etc. as opposed to when used for MIMO communication, for a joint channel, for multi-beam TX/RX, etc.

However, one transmit/receive beam pair having individual measurements that are satisfactory (e.g., acceptable, "good," satisfy at least one threshold, etc.), e.g., for pair-wise SISO, may not necessarily enable a satisfactory link when jointly configured with at least one other transmit/receive beam for multi-beam transmission/reception. For example, a transmission scheme configured for multi-beam transmission/reception may cause some transmit/receive beam pairs that are satisfactory for pair-wise SISO to be unsatisfactory when jointly configured with at least one other beam pair for multi-beam transmission/reception.

Thus, if the UE configured for group-based beam reporting reports certain beams having "good" individual measurement values (e.g., individual RSRP and/or individual SINR values satisfying a threshold) for the base station to use in configuring communication, the base station may configure multi-beam transmission/reception with the UE in a manner that is ambiguous, incorrect, inefficient, and/or unsatisfactory (e.g., fails to meet one or more performance, throughput, and/or latency conditions otherwise guaranteed for some use cases). For example, if the base station configures multi-beam transmission/reception with the UE based on a group of beams reported based on individual components and/or individual measurement values (e.g., for a SISO scheme), then the base station may incorrectly or unsatisfactorily configure precoding, multiplexing, transport blocks, codewords, modulation schemes, code rates, and/or other parameters associated with multi-beam transmission/reception.

In view of the foregoing, there exists a need for approaches to reporting resources (e.g., group(s) of beams and/or other frequency and/or temporal resources) applicable and/or useful beyond pair-wise SISO. The present disclosure provides various techniques and solutions to reporting by a UE of resources (e.g., beams) that can be used by a base station to accurately and/or satisfactorily configure multi-beam transmission/reception.

Potentially, a UE may be configured to perform CSI reporting for joint QCL, e.g., in addition to CSI reporting for individual beams. However, such additional joint QCL CSI reporting may incur some additional latency and/or overhead.

Therefore, the present disclosure describes various techniques and solutions to reporting beam information that can be used for multi-beam transmission and reception in which a UE determines (e.g., selects, identifies, etc.) resources for reporting, which may be spatial, temporal, and/or frequential, according to a certain operational mode for transmission/reception. An operational mode may include one or more of a multiplexing scheme, a use case, and/or other variables associated with communication between the base station and UE. Illustratively, the UE may be configured to select beams and/or other resources depending upon whether the operational mode for transmission/reception includes a time-division multiplexing (TDM) mode, a frequency-division multiplexing (FDM) mode, a spatial-division multiplexing (SDM) mode, an enhanced mobile broadband (eMBB) use case, an ultra-reliable low-latency communication (URLLC) use case, and/or another mode, use case, and/or scheme for such communication. For example, the UE may be configured to report information associated with one or more of spatial resources including one or more beams, temporal resources including symbols, slots, and/or subframes, and/or frequency resources including subcarriers and/or bandwidth parts.

In some aspects, the determination of resources for reporting by a UE may be based on some criteria. For example, the criteria may be based on one or more of a channel capacity, mutual information, an effective (joint) channel, and/or other information that may indicate joint QCL properties. In some further aspects, the UE may additionally report some measurement information, such as RSRP and/or SINR, corresponding to the determined resources.

In some aspects of the present disclosure, the base station may configure the UE for reporting, for example, by transmitting information indicating an operational mode for transmission/reception and/or criteria upon which determination of resources for reporting may be based; accordingly, the UE may determine resources for reporting based on the information indicating the operational mode and/or criteria received from the base station.

In some aspects of the disclosure, a first method, a first computer-readable medium, and a first apparatus are described. For example, the first apparatus may be implemented in a UE. The first apparatus may be configured to determine at least one operational mode associated with communication with a base station on a joint channel that includes two or more beam pairs between the first apparatus and the base station. The first apparatus may be further configured to determine at least one resource associated with the communication with the base station on the joint channel based on the at least one operational mode. The first apparatus may be configured to then transmit, to the base station, a group-based report associated with the joint channel, and the group-based report may include information indicating the at least one resource.

In some other aspects of the disclosure, a second method, a second computer-readable medium, and a second apparatus are described. For example, the second apparatus may be implemented in a base station. The second apparatus may be configured to determine at least one operational mode associated with communication with a UE on a joint channel that includes two or more beams pairs between the second apparatus and the UE. The second apparatus may be further configured to transmit information indicating the at least one operational mode to the UE. The second apparatus may be configured to then receive, from the UE, a group-based report including at least one resource associated with the joint channel based on the at least one operational mode.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
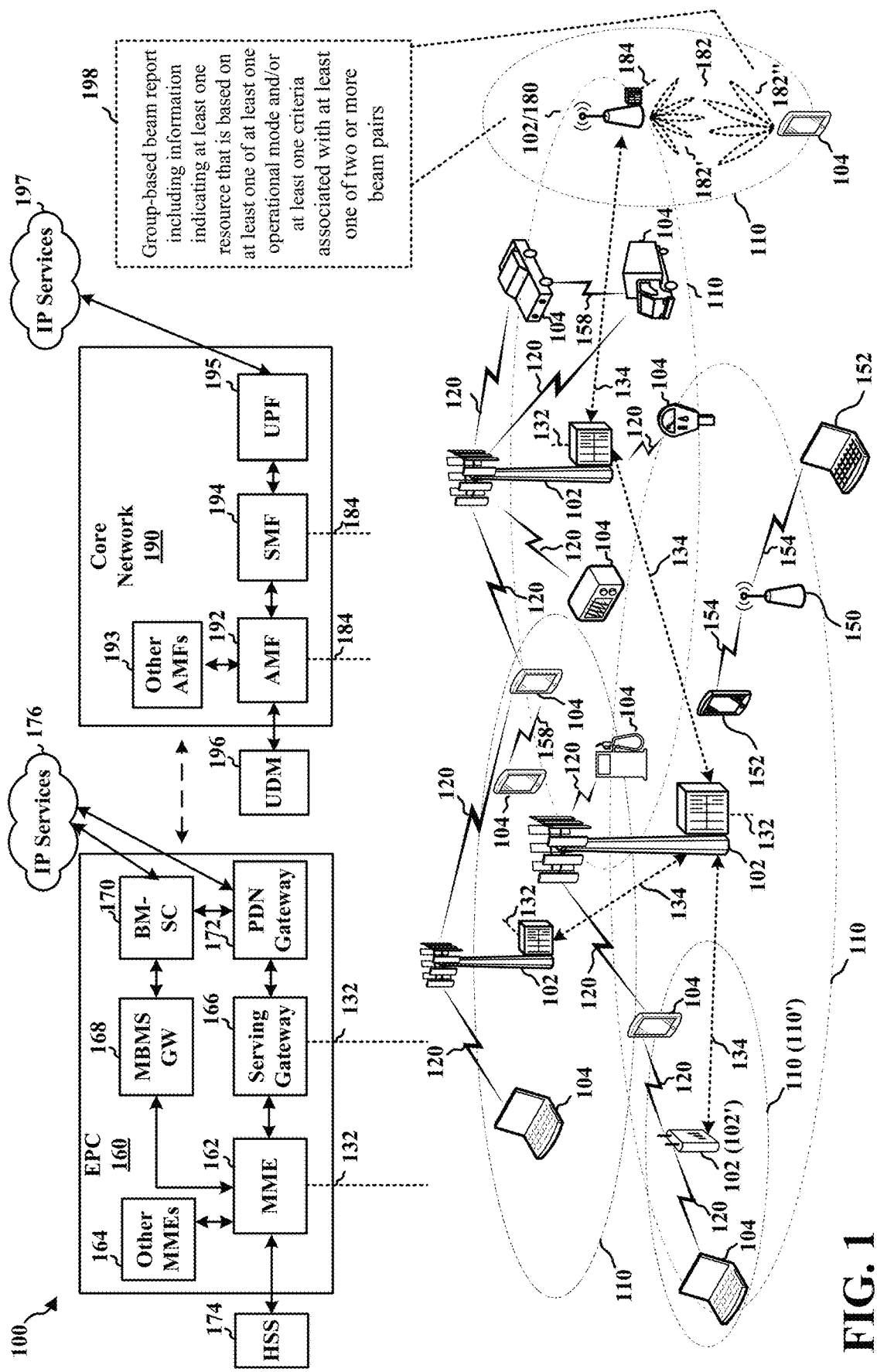
FIG. 1 is a diagram illustrating an example of a wireless communications system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In order to improve link performance and to increase throughput, wireless communication between a base station and a user equipment (UE) may use multi-beam transmission (TX) and reception (RX) (TX/RX). The use of multiple beams may provide macro-diversity as well as higher rates using multiple-input multiple-output (MIMO) techniques. Beam grouping and group-based beam reporting may support simultaneous reception at a UE, e.g., using the same spatial filters or different spatial filters at the receiver (e.g., of the UE). In some examples, the UE may use multi-beam simultaneous TX/RX. In other examples, the UE may use multi-beam non-simultaneous TX/RX. For example, the UE may employ time-division multiplexing (TDM) for non-simultaneous transmission/reception using multiple beams.

Beam pairs that individually provide satisfactory (e.g., acceptable, threshold satisfying or threshold exceeding, "good," etc.) performance and/or channel quality may cause performance and/or joint channel quality to be potentially unsatisfactory (e.g., unacceptable, threshold unsatisfying or below threshold, "poor," etc.) when jointly configured with at least one other beam pair, e.g., for simultaneous TX/RX. For example, two pairs of TX/RX beams that have satisfactory pair-wise measurements for single-input single-output (SISO) may be potentially unsuitable when jointly configured with at least one other beam pair for some transmission schemes, such as some MIMO and/or other multi-beam schemes.

In some implementations, however, a base station may configure a UE for reporting, such as channel state information (CSI) reporting (e.g., group-based beam reporting or other group-based reporting), without providing the UE with information associated with the channel that the base station intends to configure based upon the UE reporting, such as the scheme (e.g., multiplexing mode, MIMO scheme, joint transmission scheme, etc.), purpose (e.g., use case), and/or other variables/parameters that are to be configured by the base station according to the UE reporting. Thus, the UE may be unaware of whether certain resources indicated by reporting (e.g., one or more beams, one or more measurements, etc.) by the UE are suitable for the intended configuration by the base station. In other words, the UE may be agnostic to whether a transmitted report provides resources that enable the base station to configure a channel having good quality and/or performance.

For example, a report transmitted by the UE, such as a group-based beam report and/or other CSI report, may include a group of individual reports, e.g., respectively corresponding to a group of beams, with each individual report being based on a respective reference signal receive power (RSRP) and/or signal-to-interference-plus-noise ratio (SINR) (e.g., corresponding to a respective beam) without regard to the context in which the base station may use the reported group of beams. The context in which a group of beams may be used may include at least one scheme(s) (e.g., multiplexing mode, MIMO scheme, joint transmission scheme, etc.), purpose(s) (e.g., use case), and/or other variable(s)/parameter(s) that are to be configured by the base station according to the transmitted report. Consequently, the report (e.g., group of individual reports) may indicate a group of beams that is unsuitable and/or unsatisfactory to the context in which the base station may configure the group of beams. However, the base station may still use (or attempt to use) the report received from the UE to configure communication with the UE on a channel (e.g., a joint channel), e.g., even though the reported group of beams may be unsuitable and/or unsatisfactory for the intended configuration by the base station, which may result in ambiguous and/or unsatisfactory communication configuration by the base station and may further lead to failure(s) in meeting performance, throughput, latency, and/or quality conditions otherwise expected for some scheme(s), purpose(s), variable(s)/parameter(s), etc. on a channel configured by the base station.

Various aspects of the present disclosure may address some deficiencies and/or other issues caused by group-based and/or other group-based reporting when a UE is agnostic to the scheme(s), purpose(s), variable(s)/parameter(s), etc. associated with a channel to be configured by the base station based upon the group-based beam reporting and/or other group-based reporting. In particular, the present disclosure may enable a UE to determine one or more resources (e.g., spatial resources, frequency resources, and/or temporal resources) for group-based beam reporting and/or other group-based reporting by the UE. The UE may determine the one or more resources based on at least one operational mode (e.g., multiplexing mode, use case, etc.) and/or at least one criteria, e.g., such that the one or more resources reported to the base station may enable the base station to satisfactorily configure communication on a channel (e.g., a joint channel) with the UE. Thus, communication between a UE and a base station may be improved, as the UE may provide the base station with different resources that are applicable to different scheme(s), purpose(s), and/or other variable(s)/parameter(s), thereby allowing the base station to configure communication on a channel with the UE using some resources that may be more suitable in comparison to other resources in a given context.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102/180 may be configured to determine at least one operational mode associated with communication with the UE on a joint channel that may include two or more beam pairs between the base station 102/180 and the UE 104. Communication between the base station 102/180 and the UE 104 utilizing beamforming 182 may include at least one beam pair between the base station 102/180 and the UE 104. For example, a beam pair may include one TX beam of the base station 102/180 in one of transmit directions 182' paired with one RX beam of the UE 104 in one of receive directions 182" (or vice versa). On a joint channel, then, the base station 102/180 and the UE 104 may be configured to communicate using two or more beam pairs, e.g., for simultaneous TX/RX.

The base station 102/180 may be further configured to transmit information indicating the at least one operational mode to the UE 104. The base station 102/180 may be configured to then receive, from the UE 104, a group-based beam report 198 including at least one resource associated with the joint channel based on the at least one operational mode.

Correspondingly, the UE 104 may be configured to determine the at least one operational mode associated with communication with the base station 102/180 on the joint channel that includes two or more beam pairs between the UE 104 and the base station 102/180. For example, the UE 104 may determine the at least one operational mode based on the information received from the base station 102/180 indicating the at least one operational mode. The UE 104 may be further configured to determine at least one resource associated with the communication with the base station 102/180 on the joint channel based on the at least one operational mode. The at least one resource may include, for example, a set of temporal resources, a set of frequency resources, and/or a set of spatial resources (e.g., identifying one or more beams in one or more of the transmit directions 182' of the base station 102/180). The UE 104 may be configured to then transmit, to the base station 102/180, the group-based beam report 198 associated with the joint channel, and the group-based beam report 198 may include information indicating the at least one resource.

According to various aspects of the present disclosure, the base station 102/180 may be able to configure communication with the UE 104 on the joint channel based on the information indicating the at least one resource included in the group-based beam report 198. As the at least one resource may be determined by the UE 104 based on at least one operational mode associated with communication with the base station 102/180 on a joint channel, the at least one resource may be more suitable for configuring multi-beam TX/RX by the base station 102/180 for communication with the UE on the joint channel, e.g., relative to different resources that the UE 104 may have otherwise included in a group-based beam report. For example, the at least one resource based on the at least one operational mode may be determined by the UE 104 for joint quasi-colocation (QCL) properties, e.g., on a data channel, as opposed to some other resources that the UE 104 may have otherwise determined for SISO schemes.

Various other aspects of group-based reporting for configuring communication on a joint channel between a UE and a base station are further described herein.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu 0$ to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one reference (pilot) signal (RS) for the UE. In some configurations, an RS may include at least one demodulation RS (DM-RS) (indicated as $R_x$ for one particular configuration, where 100x is the port number, but other DM-RS configurations are possible) and/or at least one channel state information RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
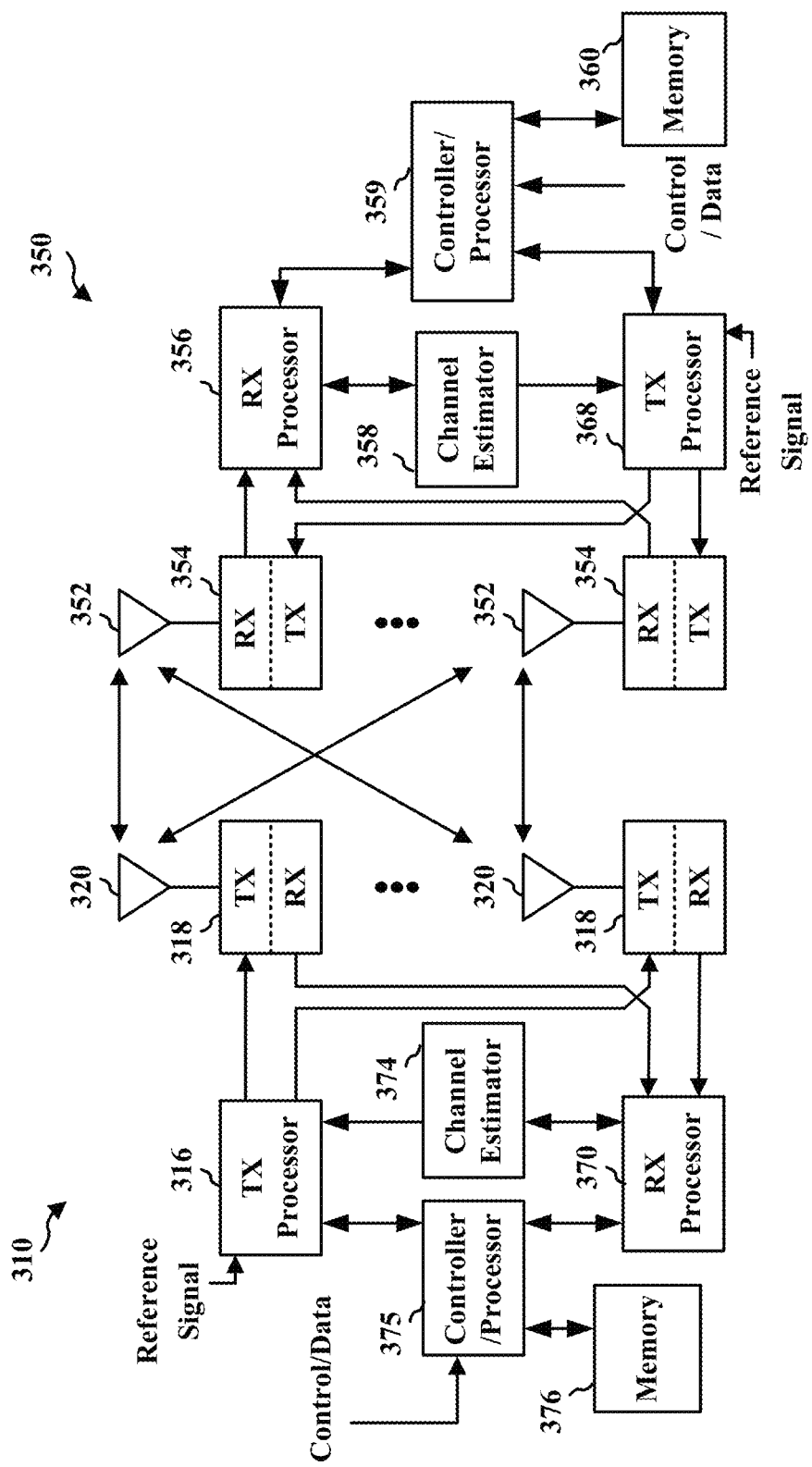
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 (L3) and layer 2 (L2) functionality. L3 includes a radio resource control (RRC) layer, and L2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement layer 1 (L1) functionality associated with various signal processing functions. L1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement L1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements L3 and L2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate modulation and coding scheme (MCS) (e.g., selected from a multiple potential MCSs), and/or to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with the group-based beam report 198 of FIG. 1.

In some other aspects, at least one of the TX processor 316, the RX processor 370, and the controller/processor 375 may be configured to perform aspects in connection with the group-based beam report 198 of FIG. 1.

As described herein, various wireless communications networks, such as access networks of 5G NR, may provide for communication between a base station and a UE in a mmW frequency spectrum (e.g., potentially including some near-mmW ranges). Thus, the base station and the UE may be configured for beamformed communication that uses directional beams. For example, a beam-pair link may be established between the base station and the UE that includes a TX beam of the base station paired with an RX beam of the UE, or vice versa.

In order to improve link performance (e.g., reliability, low latency, etc.) and/or increase throughput, beamformed communication between a base station and a UE may include multi-beam TX/RX, which may be simultaneous. For example, two or more TX beams of the base station may be correspondingly paired with two or more RX beams of the UE (or vice versa) for simultaneous TX/RX. Multi-beam TX/RX may provide macro-diversity and/or increase throughput rates (e.g., relative to communication on a single beam-pair link), e.g., for MIMO communication.

Multi-beam TX/RX may be configured by a base station for a channel (e.g., a joint channel) between the base station and the UE. For example, the UE may be configured to use one or more spatial filters, such as multiple simultaneous (TX or RX) spatial filters. The base station may rely on resources reported by the UE in order to configure such multi-beam TX/RX. For example, the UE may be configured to report one or more spatial, temporal, and/or frequency resources, which may be determined by the UE for joint QCL properties and/or other information associated with communication with the base station.

In some instances, the base station may configure the UE for group-based beam reporting, in which the UE reports up to two different resource indicators (RI) per report setting, with each RI corresponding to a TX beam of the base station (e.g., a TX beam that may be paired with an RX beam of the UE). For example, an RI may include a CSI-RS RI (e.g., referred to as a CRI) for reporting based on respective CSI-RSs received on beams and/or an SSB RI (e.g., referred to as an SSBRI) for reporting based on respective SSBs received on beams. In some aspects, CSI-RSs on resources and/or SSBs on resources may be simultaneously received by the UE, e.g., with either a single beam or with multiple simultaneous beams.

With group-based beam reporting, the UE may report a representative beam (e.g., one CRI and/or SSBRI) having at least one measurement value that is comparatively the "best" (e.g., highest, largest, etc.) relative to other measurement values corresponding to other beams. For example, the UE may report an RSRP (e.g., L1-RSRP) value and/or SINR (e.g., L1-SINR) value measured from at least one CSI-RS and/or SSB received on the representative beam. In some aspects, the UE may use up to a first number of bits (e.g., seven bits) to report the measurement value corresponding to the representative beam.

In addition, the UE may report at least one other beam (e.g., another CRI and/or SSBRI) having at least one measurement value that is comparatively "better" (e.g., higher, larger, etc.) relative to other measurement values corresponding to other beams, except for the best measurement value corresponding to the representative beam. For example, the UE may report another RSRP value measured from another CSI-RS and/or SSB received on another beam, with the other RSRP value being comparatively better than other RSRP values measured for other beams but not better than the RSRP value measured for the representative beam.

In some aspects, the UE may use up to a first number of bits (e.g., seven bits) to report the measurement value corresponding to the representative beam. For example, the first number of bits may indicate the RSRP value corresponding to the representative beam, which may be the best RSRP value of all RSRP values corresponding to beams via which the UE receives CSI-RSs and/or SSBs measured by the UE to obtain the RSRP values. However, the UE may use a second number of bits (e.g., four bits), that is less than the first number of bits, to report at least one other measurement value corresponding to at least one other beam different from the representative beam. The second number of bits may be used to indicate a differential measurement value (e.g., differential RSRP), e.g., relative to the measurement value corresponding to the representative beam (and conveyed using the first number of bits).

Illustratively, a differential measurement value may indicate a difference between the measurement value corresponding to the other beam and the best measurement value corresponding to the representative beam. A differential measurement value may be conveyed using a fewer number of bits (e.g., four bits) than the best measurement value (e.g., conveyed using seven bits). In some aspects, the differential measurement value may be conveyed as a number of intervals (e.g., increments, steps, etc.) less than the best measurement value. For example, if the best measurement value is −50 decibel-milliwatts (dBm), the other (e.g., next best) measurement value is −60 dBm, and the interval amount (e.g., step size) is 2 dBm, then the differential measurement value for the other beam may be reported by the UE with a value of 5, as −50 dBm−(2 dBm)(5)=−50−10 dBm=−60 dBm.

The grouping of beams (e.g., based on CRIs and/or SSBRIs) and the measurements associated therewith (e.g., corresponding RSRP and/or SINR values) may be intended to be used for simultaneous TX/RX with joint QCL on a data channel. For example, a UE configured to transmit a group-based beam report for a group of n beams that individually identifies each of the n beams (e.g., via a respective CRI and/or SSBIR), with each of the n beams being selected by the UE based on at least one respective individual measurement value (e.g., individual RSRP and/or SINR values) corresponding to each of the n beams. In other words, group-based beam reporting may identify a group of beams, each of which may be selected by the UE for the group based on a respective individual quality of each of those beams, such as when used as an individual link, for pair-wise SISO, etc. as opposed to when used for MIMO communication, for a joint channel, for multi-beam TX/RX, etc.

However, one beam pair having individual measurements that are satisfactory (e.g., acceptable, "good," satisfy at least one threshold, etc.), e.g., for pair-wise SISO, may not necessarily enable a satisfactory link when jointly configured with at least one other beam pair for multi-beam TX/RX. For example, a transmission scheme configured for multi-beam TX/RX may cause some beam pairs that are satisfactory for pair-wise SISO to be unsatisfactory when jointly configured with at least one other beam pair for multi-beam TX/RX.

Thus, if the UE configured for group-based beam reporting reports certain beams having "good" individual measurement values (e.g., individual RSRP and/or individual SINR values satisfying a threshold) for the base station to use in configuring communication, the base station may configure multi-beam TX/RX with the UE in a manner that is ambiguous, incorrect, inefficient, and/or unsatisfactory (e.g., fails to meet one or more performance, throughput, and/or latency conditions otherwise guaranteed for some use cases). For example, if the base station configures multi-beam TX/RX with the UE based on a group of beams reported based on individual components and/or individual measurement values (e.g., for a SISO scheme), then the base station may incorrectly or unsatisfactorily configure precoding, multiplexing, transport blocks, codewords, modulation schemes, code rates, and/or other parameters associated with multi-beam TX/RX.

In view of the foregoing, there exists a need for approaches to reporting resources (e.g., group(s) of beams and/or other frequency and/or temporal resources) applicable and/or useful beyond pair-wise SISO. The present disclosure provides various techniques and solutions to reporting by a UE of resources that can be used by a base station to accurately and/or satisfactorily configure multi-beam TX/RX.

The present disclosure describes various techniques and solutions to reporting at least one resource (e.g., at least one spatial, temporal, and/or frequency resource) that can be used for multi-beam TX/RX in which a UE determines (e.g., selects, identifies, etc.) resources for reporting, which may be spatial, temporal, and/or frequential, according to a certain operational mode. An operational mode may include one or more of a multiplexing scheme, a MIMO scheme, a joint transmission scheme, a use case (e.g., a service and/or purpose associated with communication between a UE and a base station), and/or other variable(s) associated with communication between the UE and base station. Illustratively, the UE may be configured to select beams and/or other resources depending upon whether the operational mode includes a time-division multiplexing (TDM) mode, a frequency-division multiplexing (FDM) mode, a spatial-division multiplexing (SDM) mode, a MIMO scheme, a joint transmission scheme, an enhanced mobile broadband (eMBB) use case, an ultra-reliable low-latency communication (URLLC) use case, a massive machine-type communication (mMTC) use case, and/or another mode, use case, scheme, etc. for such communication.

Potentially, a UE may be configured to perform CSI reporting for joint QCL, e.g., in addition to CSI reporting for individual beams. However, such additional joint QCL CSI reporting may incur some additional latency and/or overhead. In some aspects of the present disclosure, a UE may be configured to avoid such additional overhead by selecting resources for CSI reporting based on some additional and/or alternative information, e.g., rather than satisfactory individual measurements alone.

In some aspects, the determination of resources for reporting by a UE may be based on some criteria. For example, the criteria may be based on one or more of a channel capacity, mutual information, an effective (joint) channel, and/or other information that may indicate joint QCL properties. In some further aspects, the UE may additionally report some measurement information, such as RSRP and/or SINR, corresponding to the determined resources.

In some aspects of the present disclosure, the base station may configure the UE for reporting, for example, by transmitting information indicating an operational mode for TX/RX and/or criteria upon which determination of resources for reporting may be based; accordingly, the UE may determine resources for reporting based on the information indicating the operational mode and/or criteria received from the base station.

Figure 4:
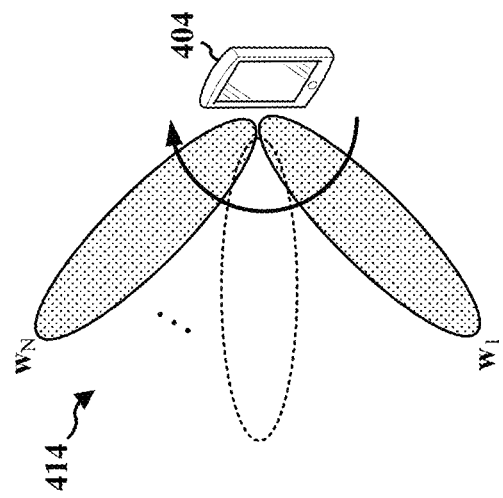
FIG. 4 is a diagram illustrating an example access network including a base station and a UE, in accordance with various aspects of the present disclosure.
Figure 4:
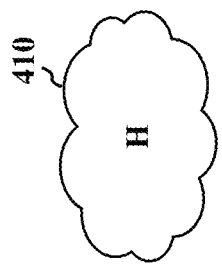
Figure 4:
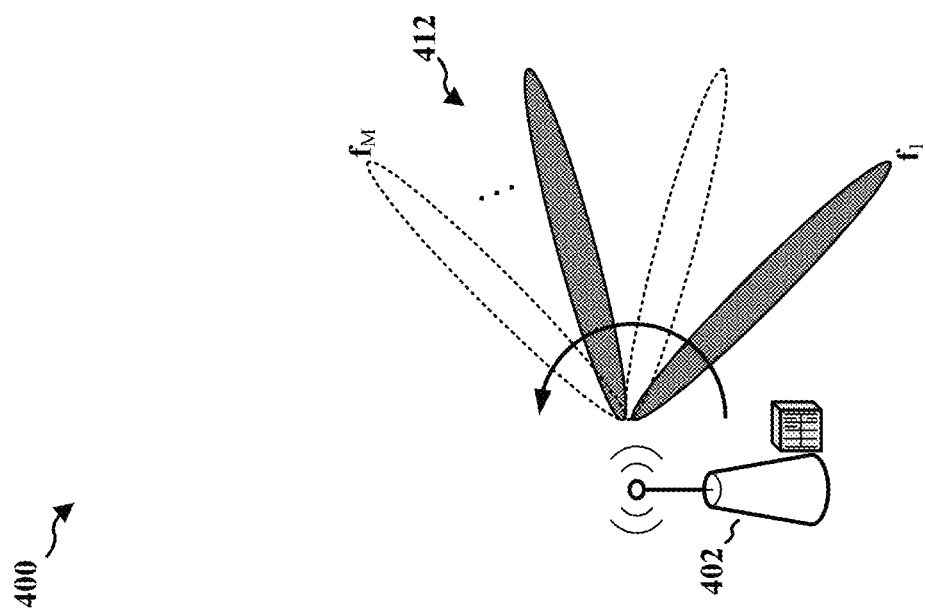

Now referring to FIG. 4, a diagram illustrates an example access network 400 including a base station 402 and a UE 404, in accordance with various aspects of the present disclosure. The base station 402 and the UE 404 may be configured to communicate on at least one channel H 410, e.g., where the at least one channel H 410 may represent a raw channel. The base station 402 and the UE 404 may be configured for mmW/near-mmW communication on at least one channel H 410 using directional beams, with the base station 402 having M beams 412 and the UE 404 having N beams 414. For example, with mmW/near-mmW communication, the base station 402 may configure a transmission scheme with the UE 404, such as a joint transmission scheme that involves at least two of the M beams 412 respectively paired with at least two of the N beams 414.

Communication in a mmW (and/or near-mmW) frequency spectrum, e.g., using at least one MIMO scheme, joint transmission scheme, and/or multiplexing scheme, may involve one or more beam pairs configured as one or more links between the base station 402 and the UE 404. A beam pair may include one of TX beams 412 from the base station 402 paired with one of RX beams 414 from the UE 404 (e.g., for transmission by the base station 402 and reception by the UE 404 and/or downlink communication). Similarly, another beam pair may include a TX beam from the UE 404 paired with an RX beam from the base station 402 (e.g., for transmission by the UE 404 and reception by the base station 402 and/or uplink communication).

In order to configure one or more beam pairs to be included for the at least one channel H 410, the UE 404 may transmit, to the base station 402 at least one beam report, such as a CSI report and/or group-based beam report. Such beam reporting by the UE 404 may be aperiodic, semi-persistent, or periodic, e.g., depending upon the beam reporting configuration received from the base station 402. The UE 404 may perform some beam training and/or channel measurements using different combinations of beams 412 from the base station 402 paired with beams 414 from the UE 404, and transmit information indicating a set of resources (e.g., a set of CRIs and/or SSBRIs and/or set(s) of other resources) to the base station 402 in a beam report based on such beam training and/or channel measurements.

In some aspects, the conditions of the channel H 410 (e.g., the environment affecting the channel H 410, such as blockages, reflectors, etc.) and/or the characteristics/capabilities of the base station 402 and/or the UE 404 (e.g., a respective number of antenna elements, the number of antenna ports with which the UE 404 can measure the channel H 410, etc.) may influence beam training/channel measurements on the channel H 410. As such, the channel H 410 may be represented as an effective channel $H_{eff}$. The effective channel $H_{eff}$ may be a function of the receiver (e.g., an analog combiner of the UE 404) $W_{RF}=[w_1, w_2, \ldots, w_N]$ and the transmitter (e.g., an analog precoder of the base station 402) $F_{RF}=[f_1, f_2, \ldots, f_M]$, where each of $W_{RF}$ and $F_{RF}$ may be a respective matrix including beam weights $w_1$, $w_2, \ldots, w_N$ and $f_1, f_2, \ldots, f_M$, respectively.

In some aspects, the base station 402 and/or the UE 404 (e.g., at respective lower layers, such as respective PHY layers and/or respective baseband layers) may observe the effective channel $H_{\mathit{eff}}$ according to Equation 1 (where $W_{RF}^*$ is the conjugate).

$$H_{\mathit{eff}} = W_{RF}^* H F_{RF} \qquad \text{(Equation 1)}$$

In some aspects, the base station 402 and the UE 404 may be configured with two or more beam pairs, e.g., for spatial diversity on the at least one channel H 410. For example, the effective (joint) channel $H_{\mathit{eff}}$ based on the joint QCL properties for simultaneous reception/transmission for two beam pairs may be given according to Equation 2.

$$H_{\mathit{eff}} = [w_k, w_l]^* H [f_i, f_j] \qquad \text{(Equation 2)}$$

Information associated with one or more beam pairs and included in a beam report from the UE 404 may be used to estimate the effective (joint) channel $H_{\mathit{eff}}$. For example, the effective (joint) channel, based on joint QCL properties for simultaneous TX/RX using two beam pairs, may be determined (e.g., estimated) according to Equation 3, representing pair-wise estimation of individual components.

$$H_{\mathit{eff}} = \begin{bmatrix} w_k^* H f_i & w_k^* H f_j \\ w_l^* H f_i & w_l^* H f_j \end{bmatrix} \qquad \text{(Equation 3)}$$

Each entry of the matrix shown in Equation 3 may correspond to one beam pair. For example, $w_i^* H f_j$ may represent the effective channel $H_{\mathit{eff}}$ with the $l^{th}$ RX beam (e.g., of beams 414 of the UE 404) and the $j^{th}$ TX beam (e.g., of the beams 412 of the base station 402). Therefore, Equation 3 may model the effective channel $H_{\mathit{eff}}$ with two beams i and j selected from the beams 412 of the base station 402 paired with the two beams k and l selected from the beams 414 of the UE 404. In particular, $w_k^*$ and $w_l^*$ respectively correspond to conjugate transposes of the $k^{th}$ and $l^{th}$ Rx beams of the UE 404.

Thus, the one or more beams selected by the UE 404 for a beam report may be based on individual channel measurements, or individual components of the effective channel $H_{\mathit{eff}}$, which may not necessarily perform equivalently (or comparably) well when configured for a joint channel, for simultaneous TX/RX, and so forth. That is, a beam pair that is individually determined to be "good" (e.g., satisfies a related threshold and/or provides good link quality/performance), such as ($w_k$, $f_i$) and/or ($w_l$, $f_j$), may not translate to a joint channel, including two or more beam pairs, that is also determined to be "good." For example, a TX/RX beam pair that is determined to have satisfactory channel measurements for a SISO scheme, such as individual channel measurements that satisfy (e.g., meet or exceed) a SISO-related threshold, may be unsatisfactory for some MIMO and/or other transmission schemes.

In some situations, the base station 402 may configure the UE 404 for group-based beam reporting without informing the UE 404 about the context in which the group-based beam reporting may be used, such as the transmission scheme, use case, and so forth. Therefore, the UE 404 may operate agnostically with regard to a transmission scheme (e.g., multiplexing mode, MIMO scheme, joint transmission scheme, etc.), purpose (e.g., use case), and/or other variables/parameters (e.g., weighing throughput against reliability) that may be affected by the group-based beam reporting (e.g., including configurations based on the group-based beam reporting) when the UE 404 selects one or more beams to report to the base station 402. Thus, the UE 404 may report, to the base station 402, information indicating one or more beams (e.g., one or more CRIs and/or SSBRIs) that results in ambiguous and/or unsatisfactory communication configurations by the base station 402, and so adversely impacts the overall channel performance.

For example, the UE 404 may be configured for group-based beam reporting, but the condition(s) (e.g., individual channel measurements) upon which the UE 404 bases selection of one or more beams for reporting may be statically defined, preconfigured, and/or the UE 404 may be otherwise unaware of how reported beams will be used by the base station 402. Illustratively, a group-based beam report may include a group of individual reports, e.g., respectively corresponding to a group of beams, and the UE 404 may select the beams of the group based on RSRP and/or SINR measurements respectively corresponding to individual beams of the group. Potentially, RSRP and/or SINR measurements respectively corresponding to individual beams may not accurately reflect the performance (e.g., reliability, throughput, channel quality, etc.) of the beams in configurations other than SISO. Consequently, beams reported by the UE 404 based on individual measurements may not enable the base station 402 to configure multi-beam (simultaneous) TX/RX (e.g., with a certain MIMO scheme, joint transmission scheme, and/or multiplexing scheme) with acceptable link performance—e.g., channel conditions may fail to reach some expected threshold(s) with respect to throughput, reliability, etc., as reported beams may fail to function equivalently (or even comparably) when jointly configured as opposed to individually configured.

In order to address such issues, the present disclosure describes various aspects of group-based beam reporting in which one or more resources reported by the UE 404 to the base station 402 may be determined according to the context to which the group-based beam reporting is applicable. For example, the context may include scheme(s) (e.g., multiplexing mode, MIMO scheme, joint transmission scheme, etc.), purpose(s) (e.g., use case), and/or other variable(s)/parameter(s) that are associated with the communication between the UE 404 and the base station 402 to which the group-based beam reporting is applicable.

Figure 5:
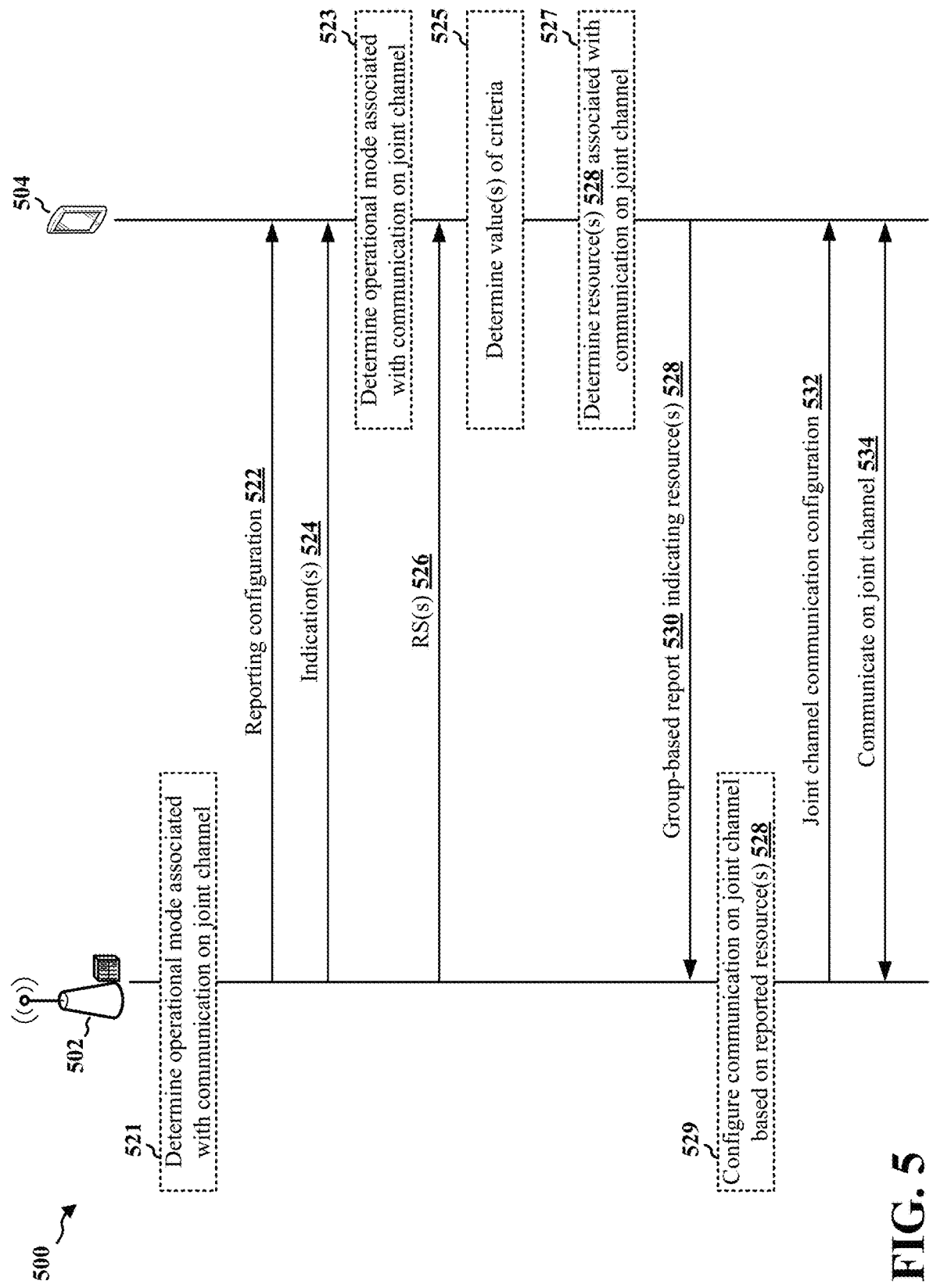
FIG. 5 is a call flow diagram illustrating an example communication flow between a base station and a UE, in accordance with various aspects of the present disclosure.

Referring to FIG. 5, a call flow diagram illustrates an example communication flow 500 between a base station 502 and a UE 504, in accordance with various aspects of the present disclosure. In the context of FIGS. 1, 3, and 4, for example, the base station 502 may be implemented as one or more of the base station 102/180, 310, and/or 402, and further, the UE 504 may be implemented as one or more of the UE 104, 350, and/or 404.

As shown in the example communication flow 500 at operation 521, the base station 502 base station may determine at least one operational mode associated with communication with the UE 504 on a joint channel that includes two or more beam pairs between the UE and the base station. In some aspects, the at least one operational mode may include at least one of a multiplexing mode and/or a use case associated with communication between the base station 502 and the UE 504. For example, the base station 502 may determine the at least one operational mode to include at least one of an SDM mode, an FDM mode, a TDM mode, an eMBB use case, and/or a URLLC use case.

In some other aspects, the at least one operational mode may be associated with one or more properties and/or characteristics expected and/or enforced on a joint channel, such as at least one property and/or characteristic that is to be prioritized over at least one other property and/or characteristic. For example, the at least one operational mode may be associated with relatively high throughput on a joint channel, and so throughput on the joint channel may be prioritized over reliability on the joint channel (or vice versa).

The base station 522 may transmit a reporting configuration 522 to the UE 504. According to the reporting configuration 522, the base station 502 may configure the UE 504 to report at least one resource. The at least one resource may include at least one spatial resource, at least one temporal resource, and/or at least one frequency resource. In one example, at least one spatial resource may include a beam, such as a TX beam of the base station 502, which may be paired with a corresponding RX beam of the UE 504. In another example, at least one temporal resource may include a symbol, a slot, a and/or a subframe. In a further example, at least one frequency resource may include a subcarrier and/or a BWP.

Potentially, the at least one resource may include a combination of any of foregoing. Additionally or alternatively, the at least one resource may include a group of two or more resources. Illustratively, the reporting configuration 522 may be (or may include) a CSI reporting configuration. The reporting configuration 522 may enable group-based reporting by the UE 504 to the base station 502, such as group-based beam reporting. For example, the reporting configuration 522 may include information configuring the UE 504 to report up to two resources (e.g., up to two CRI and/or SSBRI) per report setting.

The base station 502 may transmit the reporting configuration 522 to the UE 504 via RRC signaling, such as in an information element (IE) and/or field of an RRC message. For example, the reporting configuration 522 may include an RRC message having an IE for a CSI reporting configuration (e.g., CSI-ReportConfig IE), and the CSI reporting configuration IE may include information (e.g., a field) indicating that group-based reporting is enabled for CSI reporting by the UE 504 that is based on the CSI reporting configuration IE.

According to various aspects, the reporting configuration 522 may configure respective RSs on one or more beams (e.g., one or more beam pairs between the base station 502 and the UE 504) from the base station 502. For example, the reporting configuration 522 may include information configuring the UE 504 to receive at least one CSI-RS and/or SSB on one or more TX beams of the base station 502 paired with a respective RX beam of the UE 504. Accordingly, each of the CSI-RSs and/or SSBs may be associated with a respective TX beam of the base station 502 (e.g., forming a respective beam pair with one RX beam of the UE 504 on which each of the CSI-RSs and/or SSBs is received).

In some aspects, the reporting configuration 522 may configure the UE 504 to report some additional information associated with the at least one resource (e.g., at least one CRI and/or SSBRI). For example, the reporting configuration 522 may configure the UE 504 to report measurement information (e.g., SINR and/or RSRP) and/or other CSI information (e.g., CQI, PMI, RI, and/or LI) in addition to the at least one resource. The additional information may include some individual information associated with the at least one resource. However, when the UE 504 is configured to report a group of resources, the additional information may include information indicative of and/or based on a combination and/or joint configuration of the two or more resources, such as measurement information that is based on a joint channel including the group of resources.

Further, the base station 502 may transmit, to the UE 504, at least one indication 524. The at least one indication 524 may indicate at least one operational mode and/or at least one grouping criteria, which may be used by the UE 504 to select the at least one resource for reporting. In some aspects, the at least one indication 524 may be explicit—e.g., the at least one indication 524 may include one or more values of one or more messages that are defined to convey the at least one operational mode. In some other aspects, the at least one indication 524 may be implicit—e.g., the at least one indication 524 may include information in one or more messages from which the UE 504 is able to derive the at least one operational mode, such as by using one or more rules and/or relationships, which may be predefined in the UE 504 and/or stored in data structures (e.g., lookup tables).

In some aspects, the base station 502 may transmit the at least one indication 524 to the UE 504 via RRC signaling. Thus, the at least one indication 524 may be transmitted in an IE of an RRC message and/or in a field of an IE of an RRC message. For example, the at least one indication 524 may be received via a field of an RRC IE configuring the UE for CSI reporting (e.g., another field of the RRC IE may configure the UE for group-based reporting). In some other aspects, the base station 502 may transmit the at least one indication 524 to the UE 504 via DCI and/or a MAC control element (CE).

Potentially, the at least one indication 524 may include multiple indications. Some or all of the multiple indications may respectively correspond to some or all of the at least one operational mode and/or some or all of the at least one criteria. For example, a first set of one or more of the multiple indications may convey information indicating the at least one operational mode, whereas a second set of another one or more of the multiple indications may convey information indicating the at least one criteria.

By way of illustration and not limitation, the at least one operational mode may include a MIMO scheme, a multiplexing mode, a joint transmission scheme, and/or another transmission scheme. For example, the at least one operational mode may include one or more of single-user (SU) MIMO, multiple user (MU) MIMO, a number of layers or streams, a number of codewords (e.g., per TB), a TB size, a DM-RS configuration (e.g., a number of DM-RS ports), an SDM mode, an FDM mode, a TDM mode, a code-division multiplexing (CDM) mode, and/or other similar mode and/or transmission scheme.

Additionally or alternatively, the at least one operational mode may include a use case and/or service. Use cases and/or services may be defined and/or delivered by a RAT, such as 5G NR, e.g., in order to provide communications that adhere to some conditions and/or constraints, such as for reliability, throughput, QoS, and/or other performance specification/standard. For example, the at least one operational mode may include an eMBB use case, a URLLC use case, mMTC use case, and/or other use case, purpose, and/or service defined and/or delivered by a RAT, such as 5G NR.

In some aspects, the at least one indication 524 of the at least one operational mode may be include a set of values respectively configured for a set of RRC parameters, which may explicitly and/or implicitly convey information associated with the at least one operational mode. The set of values respectively configured for the set of RRC parameters may include one or more of a number of transmission configuration indication (TCI) states (e.g., a number of TCI states to which a TCI codepoint may map), a number of CDM groups, a repetition number associated with a URLLC use case, and/or a configuration of a scheme enabler associated with the URLLC use case.

According to some aspects, the at least one operational mode may include a joint communication or joint transmission scheme, which may be defined by a set of values respectively corresponding to a set of RRC parameters, such as a number of TCI states, a number of CDM groups, a repetition number associated with a URLLC use case, and/or a URLLC scheme enabler. For example, each of a set of RRC parameters may be configured (e.g., for the UE 504 by the base station 502) with a respective value (e.g., setting, content, specific information), and the combination of respective values with which the set of RRC parameters is configured may be defined as one joint transmission scheme. By way of illustration and not limitation, Table 1 shows multiple different joint transmission schemes, the respective values to which the set of RRC parameters may be respectively configured for the multiple different joint transmission schemes, and the UE behaviors respectively corresponding to the multiple different joint transmission schemes.

TABLE 1

| Joint TX Scheme | RRC Parameters | | | | UE Behavior |
|---|---|---|---|---|---|
| | TCI State(s) | CDM Group(s) | URLLC Rep. No. | URLLC Sch. Enblr. | |
| 0 | 1 | ≥1 | N/A | N/A | Release 15 |
| A | 1 | 1 | Condition 1 | Configured or Non-configured | Scheme 4 with rep. from same TRP |
| A' | 1 | ≥1 | Condition 2 | Non-configured | Release 15 |
| B | 2 | 1 | Condition 1 | Non-configured | Scheme 4 |
| C | 2 | 2 | Condition 2 | Non-configured | Scheme 1a/NCJT |
| E | 2 | 2 | Condition 4 | Non-configured | Scheme 1a/NCJT |
| F | 2 | 1 | Condition 4 | Configured | Scheme 2a/2b/3 |
| D" | 2 | 2 | Condition 4 | Configured | Scheme 1a/NCJT |
| G' | 1 | ≥1 | Condition 2 | Configured | Release 15 |
| G | 1 | ≥1 | Condition 4 | Configured | Release 15 |

Referring to Table 1 may include reference to one or more standards promulgated by one or more standards-defining entities, such as the Third Generation Partnership Project (3GPP), which may define standards for various RATs, such as LTE and/or 5G NR. As technologies and agreements evolve, a standards-defining entity may commensurately revise some standards—e.g., significant revisions to 5G NR standards may be separated by "Release." Therefore, reference in Table 1 to "Release 15" may indicate that the UE behavior is consistent with that defined in Release 15 of standards promulgated by 3GPP for 5G NR.

For example, the value of "0" for the joint transmission scheme may indicate that no joint transmission scheme is to be configured with the UE 504. Therefore, the number of TCI states that map to a TCI codepoint may be equal to "1," which potentially may indicate that one beam pair link is configured to communication with the UE 504 (e.g., one beam pair link is configured for use at one time, and therefore, simultaneous TX/RX may not be configured). Further, the absence of a joint transmission scheme configured for the UE 504 may (implicitly) indicate that a URLLC use case is unenforced, e.g., as configuration of each of the URLLC repetition number (Rep. No.) and the URLLC scheme enabler is not applicable or "N/A"). One or more CDM groups may be configured for communication with the UE 504, which may indicate the number of DM-RS port groups that are code-division multiplexed in the time/frequency domain is at least one. As shown in the corresponding "UE Behavior" entry, the UE 504 may operate in accordance with the standards for Release 15 promulgated by 3GPP, e.g., consistently with the set of RRC parameters being respectively configured with the aforementioned values.

In further explanation of Table 1, when the URLLC scheme enabler has a value indicating "configured," then one of URLLC schemes 2a, 2b, 3, and 4 may be configured for the corresponding joint transmission scheme, such as joint transmission schemes F, D", G', and G (and potentially A). Such URLLC schemes may further be defined by one or more standards (e.g., 5G NR). For example, different URLLC schemes may define different multiplexing modes, beamforming parameters, and/or other parameters that may be enforced when one of the URLLC schemes is configured for communication by a UE.

Illustratively, URLLC scheme 2a may include an FDM mode and one codeword for layer mapping (e.g., for spatial multiplexing). URLLC scheme 2b may include an FDM mode and two codewords of the same TB. URLLC scheme 3 may include a TDM mode with TDM in one slot. URLLC scheme 4 may include a TDM mode with TDM in different slots. In some aspects, each of URLLC schemes 2a, 2b, 3, and 4 may be based on one DCI (e.g., single DCI) for multiple TRPs (mTRP). For URLLC schemes 2a and 2b, a TCI codepoint may map to two TCI states, with URLLC scheme 2a supporting up to two transmission layers. URLLC schemes 3 and 4, however, a TCI codepoint may map to at most two TCI states (therefore, the TCI codepoint potentially maps to one TCI state).

Referring then to joint transmission scheme "A" illustrated in Table 1, the number of TCI states mapping to a TCI codepoint may be equal to "1," for example, indicating that one beam pair link is configured for communication with the UE 504. The number of CDM groups may be equal to "1," which may indicate that one group of DM-RS ports is code-division multiplexed in the time/frequency domain. According to the URLLC repetition number being configured with a value indicating "Condition 1," the UE 504 may be configured with at least one entry in a PDSCH time-domain allocation list (e.g., PDSCH-TimeDomainResourceAllocationList) that includes a URLLC repetition number (e.g., URLLCRepNumb) greater than one in a time-domain resource allocation (TDRA) field of DCI. Further, the URLLC scheme enabler may or may not be configured. The corresponding "UE Behavior" entry may indicate that the UE 504 may operate according to scheme 4, e.g., in which a TDM mode with TDM in different slots is configured. However, URLLC repetition may occur from the same TRP and/or one or more other limitations may be imposed upon the UE behavior according to scheme 4.

According to other illustrative examples, the joint transmission schemes "C" and "E" may configure communication with the UE 504 for both an SDM mode and an eMBB use case. In such joint transmission schemes "C" and "E," the TCI codepoint may map to two TCI—e.g., the UE 504 may communicate using two beam pair links (e.g., for simultaneous TX/RX). The number of CDM groups may be equal to "2" for both C and E, and therefore, two groups of DM-RS ports may be code-division multiplexed in the time/frequency domain. In joint transmission scheme C, the URLLC repetition number may be configured with a value of "Condition 2," thereby indicating that one entry in a PDSCH time-domain allocation list has no URLLC repetition number configured by DCI, but at least one entry has a URLLC repetition number. For joint transmission scheme E, however, the URLLC repetition number may be configured with a value of "Condition 4," which may indicate that none of the entries in the TDRA include a URLLC repetition number. The URLLC scheme enabler may be non-configured for both C and E. The corresponding "UE Behavior" entry may indicate that the UE 504 may be configured for non-coherent joint transmission (NCJT), or a scheme 1a, e.g., with multiple TRPs (mTRP) transmitting information (e.g., scheduling and/or other control information) to the UE 504 on at least one resource that is the same (e.g., the same frequency resources and/or the same spatial or beam resources).

In another illustrative (non-limiting) example, joint transmission scheme "D' may configure communication with the UE 504 for both an SDM mode and a URLLC use case. With D", the TCI codepoint for the UE 504 may map to two TCI states, and two CDM groups may be configured. The URLLC repetition number may be configured with the Condition 4 value, e.g., so that no URLLC repetition number is applied (as described with respect to joint transmission scheme E, supra), and the URLLC scheme enabler may be configured. The corresponding "UE Behavior" entry may indicate that the UE 504 is configured for NCJT, or scheme 1a, e.g., with mTRP transmitting information on at least one common resource (as described with respect to joint transmission schemes C and E, supra).

In yet another example, joint transmission scheme F may configure communication with the UE 504 for both an FDM mode and a URLLC use case. According to such a scheme, the TCI codepoint for the UE 504 may map to two TCI states, and a single CDM group may be configured. The URLLC repetition number may be configured with the Condition 4 value, e.g., so that no URLLC repetition number is applied (as described with respect to joint transmission scheme E, supra), and the URLLC scheme enabler may be configured. The corresponding "UE Behavior" entry may indicate that the URLLC scheme is either FDM according to scheme 2a with one codeword or scheme 2b with two codewords of the same TB or TDM within one slot according to scheme 3.

In effect, a set of RRC parameters, such as those illustrated in Table 1, may be configured with respective values that map to at least one operational mode. Therefore, the UE 504 may receive the at least one indication 524 of at least one operational mode from the base station 502 as a set of values for a set of RRC parameters, and the UE 504 may derive the at least one operational mode based on mapping the set of RRC parameter values to the at least one operational mode, e.g., using a lookup table and/or other data structure, which may be preconfigured in the UE 504 and/or signaled to the UE 504 from the base station 502.

Referring to the at least one criteria, the at least one criteria may include or may be based on one or more measurements and/or other CSI, e.g., intended to represent one or more properties and/or characteristics of a joint channel and/or joint QCL. Thus, the at least one criteria may be based on a combination, aggregate, and/or joint use of two or more resources, which may be determined (e.g., selected, identified, etc.) from multiple available or candidate resources (e.g., multiple beams forming multiple beam pairs on which the UE 504 receives RSs for beam training/management). For example, the at least one criteria may be based on calculations and/or estimation(s) of properties and/or characteristics of joint QCL and/or joint channel, which may include two or more resources (e.g., two or more beam pairs).

According to some (non-limiting) examples, the at least one criteria may include one or more spatial properties of a joint channel, such as a determined (e.g., estimated, modeled, calculated, etc.) signal gain, signal power, fading, and/or one or more other spatial properties associated with a joint channel. In some other examples, the at least one criteria may include a model of a joint channel, such as an estimation and/or simulation of wireless propagation (e.g., with spatial diversity and/or polarization) on the joint channel, and potentially accounting for blockages and/or other environmental factors affecting communication on the joint channel. Additional examples of the at least one criteria may include a capacity and/or spectral efficiency of the joint channel, such as a rate (e.g., an upper bound) at which information can be reliably communicated on using two or more resources.

In still further examples, the at least one criteria may include mutual information associated with the joint channel, such as modulated symbols and/or coded bits, a targeted block error rate (BLER), and/or other parameters associated with communication on the joint channel, which may be negotiated and/or acknowledged between the UE 504 and the base station 502 and/or may be intended to increase (e.g., maximize) throughput on the joint channel. In yet other examples, the at least one criteria may include a separation between two or more resources, such as a number of degrees of separation between at least two TX beams from the base station 502 and/or a number of degrees of separation between at least two RX beams from the UE 504 (or vice versa). According to even further examples, the at least one criteria may include one or more measurements associated with the joint channel, such as a combined RSRP, combined SINR, and/or other combined metric indicative of quality and/or interference on the joint channel.

Additionally or alternatively, the at least one criteria may include or may be based on individual information, such as one or more individual measurements and/or other individual CSI, e.g., representing one or more properties and/or characteristics of an individual channel or resource. For example, the at least one criteria may include an RSRP and/or SINR corresponding to an individual beam (e.g., an individual TX beam of the base station 502 paired with an individual RX beam of the UE 504). In some aspects, the individual information may be used in tandem with information intended to represent joint channel and/or joint QCL properties and/or characteristics. In some other aspects, the individual information may be used instead of information representing joint channel and/or joint QCL properties and/or characteristics.

At operation 523, the UE 504 may determine that at least one operational mode associated with communication with the base station 502 on a joint channel that includes two or more beam pairs between the UE 504 and the base station 502. The UE 504 may receive the at least one indication 524, and the UE 504 may determine the at least one operational mode based on the at least one indication 524. For example, the UE 504 may receive the at least one indication 524 as a set of values for a set of RRC parameters (e.g., as described with respect to Table 1, supra), and the UE 504 may map the set of values for the set of RRC parameters to the at least one operational mode.

In one (non-limiting) example of operation 523, the UE 504 may determine the at least one operational mode includes an SDM mode and an eMBB use case, such as when the number of spatial streams between the UE 504 and the base station 502 (or mTRP) is flexible. For example, the UE 504 may receive, from the base station 502, a set of values for a set of RRC parameters as shown by the entries for one of joint transmission schemes C or E in Table 1, supra. In response to receiving values of RRC parameters consistent with one of joint transmission schemes C or E in Table 1, the UE 504 may determine that communication is configured with and SDM mode and with eMBB service parameters (e.g., thresholds) observed and/or enforced.

In another example of operation 523, the UE 504 may determine the at least one operational mode includes an SDM mode and a URLLC use case, such as when one spatial stream is configured between the UE 504 and the base station 502. For example, the UE 504 may receive, from the base station 502, a set of values for a set of RRC parameters as described with respect to joint transmission scheme D" in Table 1, supra. In response to receiving values of RRC parameters consistent with joint transmission scheme D" in Table 1, the UE 504 may determine that communication is configured with an SDM mode and with URLLC service parameters (e.g., thresholds) observed and/or enforced.

In another example of operation 523, the UE 504 may determine the at least one operational mode includes an FDM mode and an eMBB use case. For example, the UE 504 may receive, from the base station 502, a set of values for a set of RRC parameters as described with respect to joint transmission scheme B in Table 1, supra. In response to receiving values of RRC parameters consistent with joint transmission scheme B in Table 1, the UE 504 may determine that communication is configured with an FDM mode and with eMBB service parameters (e.g., thresholds) observed and/or enforced.

In still a further example of operation 523, the UE 504 may determine the at least one operational mode includes an FDM mode and an URLLC use case. For example, the UE 504 may receive, from the base station 502, a set of values for a set of RRC parameters as described with respect to joint transmission scheme F in Table 1, supra. In response to receiving values of RRC parameters consistent with joint transmission scheme F in Table 1, the UE 504 may determine that communication is configured with an FDM mode and with URLLC service parameters (e.g., thresholds) observed and/or enforced.

In some aspects, information indicating the at least one operational mode may be absent from the at least one indication 524. Potentially, at operation 523, the UE 504 may determine the at least one operational mode based on the at least one criteria. For example, the UE 504 may determine the at least one operational mode includes an eMBB use case (or other similar use case) when the at least one criteria prioritizes throughput over reliability. In another example, the UE 504 may determine the at least one operational mode includes a URLLC use case (or other similar use case) when the at least one criteria considers both throughput and reliability. In some other aspects, information indicating the at least one criteria may be absent from the at least one indication 524. Instead, the UE 504 may determine the at least one criteria based on the at least one operational mode. For example, the at least one criteria may be preconfigured in the UE 504 in association with the at least one operational mode, such that when the UE 504 determines the at least one operational mode, the at least one criteria is known by the UE 504 to be applicable to the at least one operational mode.

In order for the UE 504 to determine resources for reporting, the base station 502 may transmit RSs 526. Each of the RSs 526 may be a CSI-RS and/or an SSB. In some aspects, the reporting configuration 522 may configure the time/frequency resources on which the RSs 526 are carried. The RSs 526 may be used for beam training and/or beam management, and therefore, each of the RSs 526 may indicate a respective beam of the base station 502 on which the RS is carried. For example, each of the RS 526 may include information identifying the respective beam on which the RS is carried and/or an RS may be carried on some time and/or frequency resource(s) that corresponds to the beam of the base station 502 on which the RS is carried.

At operation 525, the UE 504 may determine one or more values of the at least one criteria. The UE 504 may determine the at least one criteria based on the at least one indication 524 received from the base station 502, and further, the UE 504 may determine the one or more values of the at least one criteria based on the RSs 526 received from the base station 502.

In some aspects of operation 525, the UE 504 may determine the one or more values of the at least one criteria using a combination of two or more resources, such as two or more beams. For example, the at least one criteria may be intended to represent joint channel and/or joint QCL properties and/or characteristics, and the UE 504 may determine one or more values corresponding to joint channel and/or joint QCL properties and/or characteristics based on using two or more resources of a joint channel, such as two or more beams of two or more beam pairs. For example, the UE 504 may measure a combined SINR and/or a combined RSRP based on receiving a respective one of RSs 526 on each of the two or more resources (e.g., two or more beams of two or more beam pairs).

An example of the at least one criteria may include a highest combined SINR and/or a highest combined RSRP for two or more beam pair links in which the two or more TX beams have a beam separation of at least XTX degrees (e.g., at the base station 502) and the two or more RX beams have a beam separation of at least $X_{RX}$ degrees (e.g., at the UE 504). Therefore, the UE 504 may refrain from determining values of the highest combined SINR and/or RSRP for each combination of beam pair links in which the beam separation between the TX beams is less than $X_{TX}$ degrees and the beam separation between the RX beams is less than $X_{RX}$ degrees.

In another aspect of operation 525, the UE 504 may determine a respective throughput associated with using multiple different combinations of multiple different resources. For example, the UE 504 may measure a value indicative of throughput for multiple different combinations of beam pairs on which the UE 504 receives RSs 526. In some aspects, the UE 504 may measure a respective spectral efficiency for multiple different combinations of beam pairs on which the UE 504 receives RSs 526. In some other aspects, the UE 504 may measure another value that is based on mutual information for multiple different combinations of beam pairs on which the UE 504 receives RSs 526.

In a further aspect of operation 525, the UE 504 may determine a respective reliability associated with using multiple different combinations of multiple different resources. For example, the UE 504 may measure a value indicative of reliability for multiple different combinations of beam pairs on which the UE 504 receives RSs 526. In some aspects, the UE 504 may measure a respective BLER for multiple different combinations of beam pairs on which the UE 504 receives RSs 526.

In still other aspects of operation 525, the UE 504 may determine (e.g., estimate, compute, calculate, etc.) an effective joint channel using multiple different combinations of multiple different resources (e.g., beams). For example, the UE 504 may estimate the effective joint channel for multiple different combinations of beam pairs on which the UE 504 receives RSs 526.

Additionally or alternatively, the UE 504 may determine one or more values for individual resources based on the at least one criteria. For example, the at least one criteria may include a threshold and/or relationship relative to other individual resources, such as a criteria defining a minimum threshold and/or a criteria indicating the at least two resources having the "best" (e.g., highest, largest, greatest) individual measurements relative to other individual measurements for other resources. For example, the at least one criteria may be based on respective individual RSRP and/or individual SINR values measured for RSs 526 respectively received on each of the beams from the base station 502 forming beam pairs with the UE 504.

An example of the at least one criteria may include the highest two individual SINR and/or highest two individual RSRP values for two or more beam pair links in which the two TX beams have a beam separation of at least $X_{TX}$ degrees (e.g., at the base station 502) and the two RX beams have a beam separation of at least $X_{RX}$ degrees (e.g., at the UE 504). Therefore, the UE 504 may refrain from determining individual SINR and/or individual RSRP values for each combination of beam pair links in which the beam separation between the TX beams is less than $X_{TX}$ degrees and the beam separation between the RX beams is less than $X_{RX}$ degrees.

At operation 527, the UE 504 may determine at least one resource 528 associated with the communication with the base station on the joint channel based on the at least one operational mode. The at least one resource may include one or more spatial, temporal, and/or frequency resources. For example, a spatial resource may include a beam and/or beam pair, a temporal resource may include a symbol, slot, and/or subframe, and a frequency resource may include a subcarrier and/or BWP. Additionally or alternatively at operation 527, the UE 504 may determine the at least one resource 528 (e.g., at least one beam) associated with group-based reporting (e.g., group-based beam reporting) further based on the at least one criteria. In some aspects, the at least one operational mode may indicate the at least one criteria—e.g., the UE 504 may determine the at least one criteria to apply for the determination of the at least one resource 528, at operation 527, based on the at least one operational mode, determined at operation 523.

For example, the at least one operational mode may include an SDM mode and an eMBB use case, e.g., for a flexible number of spatial streams, or the at least one operational mode may otherwise be determined to prioritize throughput over other channel properties/characteristics (e.g., including reliability). The at least one criteria may specify that the UE 504 is to select a combination of at least two resources that is determined (e.g., estimated, calculated, etc.) to maximize (or attempt to maximize) throughput relative to other combinations of at least two resources. Therefore, the UE 504 may determine at least one respective value indicative of throughput (e.g., a value for spectral efficiency, a value based on mutual information, etc.) for each combination of at least two resources, e.g., on which the UE 504 receives RSs 526. The UE 504 may then compare each of the values indicative of throughput to one another in order to identify the "best" value for maximization of throughput, such as the highest or greatest value (e.g., depending upon the metric) relative to each of the other values.

Accordingly, the UE 504 may select the resources (e.g., beams of the base station 502) of the combination corresponding to the "best" value for maximization of throughput when configured with an SDM mode and an eMBB use case. The at least one resource 528 may include at least two TX beams of the base station 502 respectively paired with at least two RX beams of the UE 504, and the UE 504 may identify the TX beams based on at least two of the RSs 526 respectively received via the identified at least two TX beams. For example, the UE 504 may identify the at least one resource 528 as the at least two beams from the base station 502 based on at least one CSI-RS and/or SSB respectively received on each of the two (or more beams) (e.g., based on a set of time/frequency resources on which at least one CSI-RS and/or SSB is received on each of at least two beams).

In another example, the at least one operational mode may include an SDM mode and a URLLC use case, e.g., for one spatial stream, or the at least one operational mode may otherwise be determined to consider both throughput and reliability (although one may be prioritized over the other). The at least one criteria may specify that the UE 504 is to select a combination of at least two resources that is determined (e.g., estimated, calculated, etc.) to maximize (or attempt to maximize) combined SINR and/or combined RSRP relative to other combinations of at least two resources. Additionally, the at least one criteria may specify that the at least two resources are to include at least two TX beams of the base station 502 having a beam separation of at least $X_{TX}$ degrees and paired with at least two RX beams of the UE 504 having a beam separation of at least $X_{RX}$ degrees. Therefore, the UE 504 may determine a respective combined SINR and/or combined RSRP value for each combination of at least two resources, e.g., on which the UE 504 receives RSs 526, having a beam separation of at least $X_{TX}$ degrees at the base station 502 and being paired with at least two beams having a beam separation of at least $X_{RX}$ degrees at the UE 504. The UE 504 may then compare each of the determined combined SINR and/or combined RSRP values to one another in order to identify the "best" combined SINR and/or combined RSRP value, such as the highest or greatest combined SINR and/or combined RSRP value relative to each of the other combined SINR and/or combined RSRP values.

The UE 504 may select, as the at least one resource 528, each of the at least two beams of the base station 502 having a beam separation of at least $X_{TX}$ degrees, which form one side of the combination of the at least two beam pairs having the best combined SINR and/or combined RSRP value, and further, are paired with at least two RX beams of the UE 504 having a beam separation of at least $X_{RX}$ degrees. Accordingly, the UE 504 may select the resources (e.g., TX beams of the base station 502) having at least a minimum amount of separation, and also corresponding to the combined SINR and/or combined RSRP value that is comparatively the "best" relative to other combined SINR and/or combined RSRP values. In so doing, the UE 504 may select that at least one resource 528 to reconcile throughput with latency, e.g., in order to adhere to the at least one operational mode.

In a further example, the at least one operational mode may include an FDM mode and an eMBB use case, or other operational mode(s) having some constraints similar to an eMBB use case with FDM. The at least one criteria may specify that the UE 504 is to select each of at least two resources that is determined (e.g., estimated, calculated, etc.) to maximize (or attempt to maximize) reliability relative to other resources. In some aspects, the UE 504 may determine a respective individual SINR and/or individual RSRP value corresponding to each of the resources, e.g., on which the UE 504 receives RSs 526. The UE 504 may then compare each of the individual SINR and/or RSRP values to one another in order to identify at least two "best" individual values (e.g., for maximization of reliability), such as the two individual SINR and/or RSRP values that are highest or greatest relative to each of the other individual SINR and/or RSRP values.

Accordingly, the UE 504 may determine the at least one resource 528 by selecting at least two resources (e.g., beams of the base station 502) corresponding to the two "best" individual SINR and/or RSRP values. For example, the at least one resource 528 may include at least two TX beams of the base station 502 respectively paired with at least two RX beams of the UE 504, and corresponding to the two "best" individual SINR and/or RSRP values, e.g., based on respective individual SINR and/or individual RSRP values measured from CSI-RSs and/or SSBs received via the at least two TX beams.

In yet other aspects, the at least one operational mode may include an FDM mode and an URLLC use case, or other operational mode(s) providing some minimum level of both throughput and reliability with FDM. The at least one criteria may specify that the UE 504 is to select each of at least two resources having the highest individual SINR and/or individual RSRP values relative to other individual SINR and/or individual RSRP values. The at least one criteria may further specify that the at least two resources (e.g., having the highest individual SINR and/or individual RSRP values) are to include at least two TX beams of the base station 502 having a beam separation of at least $X_{TX}$ degrees and paired with at least two RX beams of the UE 504 having a beam separation of at least $X_{RX}$ degrees. Therefore, the UE 504 may determine a respective individual SINR and/or individual RSRP value for each potential resource, e.g., on which the UE 504 receives RSs 526, having a beam separation of at least $X_{TX}$ degrees at the base station 502 and being paired with at least two beams having a beam separation of at least $X_{RX}$ degrees at the UE 504. The UE 504 may then compare each of the determined individual SINR and/or individual RSRP values to one another in order to identify the two "best" individual SINR and/or individual RSRP values, such as the two highest or greatest individual SINR and/or individual RSRP values relative to each of the other individual SINR and/or individual RSRP values.

Therefore, the UE 504 may select, as the at least one resource 528, at least two (TX) beams of the base station 502 having a beam separation of at least $X_{TX}$ degrees and respectively paired with at least two (RX) beams of the UE 504 having a beam separation of at least $X_{RX}$ degrees, which respectively form at least two beam pairs having the two best individual SINR and/or individual RSRP values relative to each other individual SINR and/or individual RSRP value corresponding to each other (TX) beam of the base station 502 (e.g., having a beam separation of at least $X_{TX}$ degrees and respectively paired with at least two (RX) beams of the UE 504 having a beam separation of at least $X_{RX}$ degrees).

The UE 504 may generate a group-based report 530 and include, in the group-based report, information indicating the at least one resource 528. In some aspects, the UE 504 may identify the at least one resource 528 as at least two beams from the base station 502 based on at least one CSI-RS and/or SSB respectively received on each of the at least two (or more beams). For example, the UE 504 may identify each of the at least two beams to indicate as the at least one resource 528 based on a set of time/frequency resources on which at least one CSI-RS and/or SSB is received on each of at least two beams.

In some aspects, the UE 504 may use an RI to convey a respective identifier (ID) or index of the at least one resource 528 in the group-based report 530. For example, the UE 504 may use a respective CRI and/or SSBRI to convey a respective beam ID or index of each of the at least two (TX) beams of the base station 502 determined as the at least one resource 528 by the UE 504 based on the at least one operational mode and/or the at least one criteria. The UE 504 may determine a respective CRI and/or SSBRI using information and/or time/frequency resource(s) of at least one CSI-RS and/or SSB respectively received on each of the at least two (TX) beams of the base station 502 determined as the at least one resource 528.

Potentially, the UE 504 may include some information indicative of a quality, performance, throughput, reliability, etc. associated with the at least one resource 528. Such information may be derived when the UE 504 determines the at least one value of the at least one criteria, as shown at operation 525. For example, the UE 504 may include, in the group-based report 530, information indicating one or more values determined for the at least one criteria, such as the "best" (e.g., highest, greatest, etc.) measurement values and/or the number of degrees of beam separation between at least two (RX) beams of the UE 504 respectively paired with at least two resources (e.g., beams of the base station 502).

In some aspects, the UE 504 may include some information indicative of joint channel and/or joint QCL properties and/or characteristics based on using a combination of resources (e.g., beams) to receive RSs 526. For example, such information may indicate measurement and/or other information corresponding to at least two (TX) beams of the base station 502 based on measuring at least one of the RSs 526 that is jointly received via the at least two (TX) beams of the base station 502. Illustratively, such information may indicate one or more of mutual information associated with a joint channel including the at least one resource 528 (e.g., including at least two (TX) beams of the base station 502), spectral efficiency associated with the joint channel, a combined SINR and/or combined RSRP value(s) measured in response to jointly receiving at least one of the RSs 526 via the at least one resource that includes at least two of the (TX) beams, an estimation or other computation of an effective joint channel, and/or other measurement(s) and/or information indicative of joint channel and/or joint QCL properties and/or characteristics.

In some other aspects, the UE 504 may include some information indicative of individual quality, performance, throughput, reliability, etc. of each individual resource included in the joint channel (e.g., for joint QCL on a data channel). For example, such individual information may indicate one or more individual measurements and/or other individual information corresponding to each resource of the at least one resource 528. Illustratively, such information may indicate a respective individual SINR value and/or respective individual RSRP value corresponding to each (TX) beam of the base station 502 determined as the at least one resource 528.

As described, supra, the UE 504 may identify a group of n resources (e.g., beams) in the group-based report 530, such as the n "best" resources. For example, the n best resources may include the n beams having the highest individual RSRP and/or SINR values respectively corresponding thereto. In another example, the n best resources may include the best combinations of resources corresponding to the "best" combined values—e.g., the UE 504 may determine n/2 joint beam pairs corresponding to highest combined SINR and/or combined RSRP values measured when simultaneously using two joint beam pairs (e.g., for simultaneous TX/RX).

In some aspects, at least one measurement value corresponding to the "best" resource (or best combination of resources) may be reported as a measured value, e.g., using a first set of bits (e.g., 7 bits). However, other next best measurement values (e.g., n−1 measurement values) corresponding to the next best resources (or next best combinations of resources) may be reported as respective differential values relative to the best measurement value, e.g., using a second set of bits (e.g., 4 bits).

For example, the at least one resource 528 may include two TX beams of the base station 502 respectively paired with two RX beams of the UE 504 to form respective beam pairs via which the UE 504 receives CSI-RSs of the RSs 526. The UE 504 may report the best individual RSRP value (e.g., highest dBm value) corresponding to one TX beam of the base station 502 as a measured number expressed in dBm. However, the UE 504 may report the second (or next) best individual RSRP value corresponding to another TX beam of the base station 502 as a differential value relative to the measured number expressed in dBm corresponding to the best individual RSRP value.

For example, the UE 504 may report the second best individual RSRP value as a number of intervals or "steps" separating the best individual RSRP value from the second best individual RSRP value. The size or amount (e.g., number of dBm) of the interval or "step" may be preconfigured in the UE 504 and/or may be signaled to the UE 504 by the base station 502. In effect, the UE 504 may report a differential value—indicating one measurement value relative to another measurement value—as a multiplicative factor or coefficient to be multiplied with the interval (or step) to obtain a product, and the difference between the product and the best measurement value may indicate another measurement value corresponding to another reported resource, such as the second best TX beam of the base station 502.

The UE 504 may then transmit, to the base station 502, the group-based report 530 associated with the joint channel and including information indicating the at least one resource 528 based on the at least one operational mode and/or the at least one criteria. In some aspects, the group-based report 530 may include a CSI report for which group-based beam reporting is enabled. For example, the base station 502 may configure the UE 504 through the reporting configuration 522 to transmit the group-based report 530 (e.g., a CSI report in which group-based beam reporting is enabled).

The base station 502 may correspondingly receive the group-based report 530 including the information indicating the at least one resource 528. At operation 529, the base station 502 may be configure communication with the UE 504 on a joint channel using the reported at least one resource 528 based on the group-based report 530 including the information indicating the at least one resource 528. For example, the at least one resource 528 may include at least two beams corresponding to at least two beam pairs with the UE 504, and the base station 502 may configure the joint channel to include the at least two beams corresponding to the at least two beam pairs with the UE 504.

In some aspects, the base station 502 may configure communication with the UE 504 by configuring simultaneous TX/RX with the UE 504 using at least two beams, which may be included in the at least one resource 528. In some other aspects, the base station 502 may configure communication with the UE 504 by scheduling downlink data and/or control information for transmission to the UE 504 and/or by scheduling uplink data and/or control information for reception from the UE 504. In some further aspects, the base station 502 may configure communication with the UE 504 by configuring one or more transmission parameters and/or configuring one or more resources of the reported at least one resource 528 to be used for communication with the UE 504 based on the group-based report 530. For example, the base station 502 may configure, based on the at least one resource 528, one or more of precoding, TBs (e.g., TB size), data rate, coding rate, MCS, spatial streams, spatial filters, and/or other transmission-related parameters with the UE 504 using the at least one resource 528.

The base station 502 may then transmit, to the UE 504, a joint channel communication configuration 532 based on the group-based report 530 (e.g., based on the reported at least one resource 528). The UE 504 may receive the configuration 532 from the base station 502, and based thereon, the UE 504 may determine (e.g., adjust, alter, set, etc.) one or more transmission parameters for communication with the base station 502 on the joint channel. In some aspects, the UE 504 may determine to use at least two of the reported at least one resource 528 for communication with the base station 502 based on the received configuration 532. In some other aspects, the UE 504 may determine a beamforming configuration (e.g., beam weights), precoding information, MCS, TB configuration (e.g., TB size), data rate, coding rate, spatial filter and/or spatial stream configuration(s), and/or other transmission-related parameters for communication with the base station 502 on the joint channel. For example, the UE 504 may determine to use at least one of a single spatial filter or multiple simultaneous spatial filters for simultaneous TX/RX based on the received configuration 532. In some other examples, the UE 504 may determine, based on the configuration 532, a time (e.g., symbol, slot, and/or subframe) at which to apply one or more beams for communication with the base station 502 on the joint channel. In still other examples, the UE 504 may determine, based on the configuration 532, one or more weights (e.g., of a beamforming matrix) and/or other beamforming parameters.

Accordingly, the base station 502 and the UE 504 may communicate 534 on the joint channel based on the joint channel communication configuration 532. In some aspects, the base station 502 and the UE 504 may communicate on the joint channel using one or more resources of the at least one resource 528 configured by the base station 502 based on the group-based report 530. For example, the base station 502 and the UE 504 may communicate 534 using at least two resources (e.g., corresponding to beams of beam pairs) for multi-beam simultaneous TX/RX. In some other examples, the base station 502 may be configured to transmit, and the UE 504 may be configured to receive, multiple (simultaneous) spatial streams according to a MIMO scheme (e.g., SU-MIMO scheme or MU-MIMO scheme) based on the configuration 532.

Figure 6:
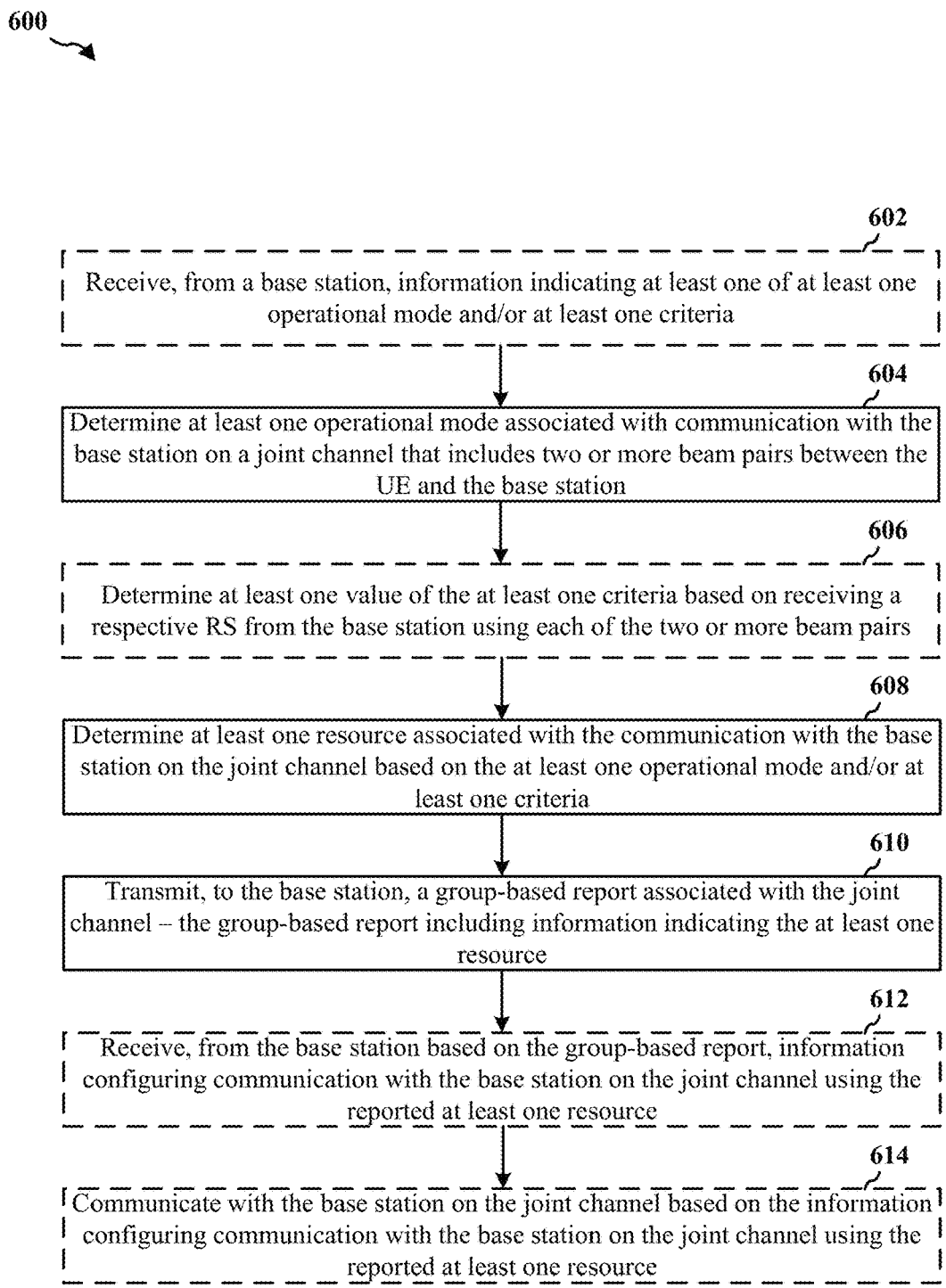
FIG. 6 is a flowchart of an example method of wireless communication that may be performed with a UE and/or apparatus, in accordance with various aspects of the present disclosure.

FIG. 6 is a flowchart of a method 600 of wireless communication. The method 600 may be performed by a UE or a component of a UE. For example, in the context of one or more of FIGS. 1 and 3-5, the method 600 may be performed by at least one of a UE 104, 350, 404, 504; a processing system, which may include the memory 360 and which may be the entire UE 350 or a component of the UE 350, for example, at least one processor, such as the TX processor 368, the RX processor 356, and/or the controller/processor 359; and/or an apparatus, such as an apparatus 802, described infra. According to various different aspects, one or more of the illustrated blocks of the method 600 may be transposed, omitted, and/or contemporaneously performed.

The method 600 may enable the UE to determine at least one resource (e.g., a group of resources) to be reported to a base station for communication on a joint channel with the base station. The method 600 may improve beam management for TX/RX using multiple beams while reducing the overhead (e.g., signaling, processing, etc.) and/or errors that may otherwise be commensurate with group-based beam reporting that includes additional CSI reporting for joint QCL and/or group-based beam reporting when the UE is agnostic to or unaware of the context in which the group-based beam reporting is to be used by the base station.

At 602, a UE may receive, from a base station, information indicating at least one of at least one operational mode and/or at least one criteria associated with communication with the base station on a joint channel that may include two or more beam pairs between the UE and the base station. According to various aspects, the information indicating at least one of at least one operational mode and/or at least one criteria may be received via one of RRC signaling, at least one MAC CE, and/or DCI. For example, the information indicating at least one of at least one operational mode and/or at least one criteria may be received from the base station in a reporting configuration (e.g., CSI reporting configuration) in which group-based beam reporting is enabled.

In some aspects, the information indicating the at least one of the at least one operational mode and/or the at least one criteria may include a respective value of each of a set of RRC parameters associated with the at least one operational mode. For example, the respective values of the set of RRC parameters may include at least one of a number of TCI states, a number of CDM groups, a repetition number associated with a URLLC use case, and/or a configuration for a scheme enabler associated with the URLLC use case.

In some other aspects, the at least one criteria may be based on at least one of a capacity associated with the joint channel, mutual information associated with the joint channel, a spectral efficiency associated with the joint channel, an RSRP associated with at least one of the two or more beam pairs, an SINR associated with at least one of the two or more beam pairs, and/or a beam separation associated with the two or more beam pairs.

In the context of FIG. 5, the UE 504 may receive, from the base station 502, the at least one indication 524 indicating at least one operational mode and/or at least one grouping criteria associated with communication with the base station 502 on a joint channel that includes two or more beam pairs between the UE 504 and the base station 502. In some aspects, the UE 504 may receive the at least one indication 524 in the reporting configuration 522 (e.g., CSI reporting configuration), which may enable group-based beam reporting for the UE 504.

At 604, the UE may determine at least one operational mode associated with communication with the base station on the joint channel that includes two or more beam pairs between the UE and the base station. In some aspects, the at least one operational mode may include at least one of a multiplexing mode and/or a use case associated with communication between the UE and the base station. For example, the UE may determine the at least one operational mode to include at least one of an SDM mode, an FDM mode, a TDM mode, an eMBB use case, and/or a URLLC use case.

In some other aspects, the at least one operational mode may be associated with one or more properties and/or characteristics expected and/or enforced on a joint channel, such as at least one property and/or characteristic that is to be prioritized over at least one other property and/or characteristic. For example, the at least one operational mode may be associated with relatively high throughput on a joint channel, and so throughput on the joint channel may be prioritized over reliability on the joint channel (or vice versa).

In some aspects, the UE may determine the at least one operational mode based on the at least one indication received from the base station. For example, the UE may receive, from the base station, a set of values respectively configured for a set of RRC parameters. The UE may determine the at least one operational mode based on the set of values respectively configured for a set of RRC parameters, which may map to at least one operational mode of multiple potential operational modes. For example, the UE may access a lookup table or other mapping information indicating correspondence between multiple potential operational modes and sets of values of sets of RRC parameters (or subsets of values of subsets of RRC parameters), and therefore, the UE may identify the at least one operational mode by identifying at least one entry in the lookup table or other mapping information defining at least one relationship between the set of values of the set of RRC parameters and at least one operational mode and/or defining at least one relationship between a subset of the set of values for a subset of the set of RRC parameters and at least one operational mode. Thus, the UE may determine the at least one operational mode by identifying the at least one entry that is applicable (e.g., matches) the set (or subset) of values for the set (or subset) of RRC parameters received from the base station.

In the context of FIG. 5, at operation 523, the UE 504 may determine the at least one operational mode associated with communication with the base station 502 on the joint channel. For example, the UE 504 may determine the at least one operational mode based on the at least one indication 524 received from the base station 502.

At 606, the UE may determine at least one value of the at least one criteria based on receiving a respective RS from the base station using each of the two or more beam pairs. For example, the UE may receive, from the base station, at least one CSI-RS and/or SSB using each of multiple candidate beam pairs. The UE may measure at least one value corresponding to each of the multiple candidate beam pairs based on receiving at least one respective CSI-RS and/or SSB on each of the multiple candidate beam pairs. For example, the UE may measure at least one RSRP value and/or SINR value corresponding to each of the multiple candidate beam pairs based on receiving at least one CSI-RS and/or SSB on each of the multiple candidate beam pairs.

In some aspects, the at least one value of the at least one criteria may include an individual value of an individual criteria. For example, the UE may determine at least one individual RSRP value and/or individual SINR value of an individual RSRP criteria and/or individual SINR criteria based on receiving at least one CSI-RS and/or SSB on one of the multiple candidate beam pairs.

In some other aspects, the at least one value of the at least one criteria may include a combined, aggregate, and/or joint value of a combined, aggregate, and/or joint criteria. For example, the UE may determine at least one combined RSRP value and/or combined SINR value of a combined RSRP criteria and/or combined SINR criteria based on receiving at least one CSI-RS and/or SSB on a joint channel that includes two or more of the multiple candidate beam pairs.

In the context of FIG. 5, at operation 525, the UE 504 may determine at least one value of the at least one criteria based on receiving a respective one of the RSs 526 from the base station 502 using at least one beam pair of multiple candidate beam pairs between the UE 504 and the base station 502. For example, the UE 504 may receive, from the base station 502, at least one CSI-RS and/or SSB using at least one of multiple candidate beam pairs between the UE 504 and the base station 502.

At 608, the UE may determine at least one resource associated with communication with the base station on the joint channel based on at least one of the at least one operational mode and/or the at least one criteria. According to various different aspects, the at least one resource may include at least one of a set of spatial resources, a set of frequency resources, and/or a set of temporal resources. For example, a set of spatial resources may include at least one beam of at least one beam pair between the UE and the base station, a set of frequency resources may include at least one subcarrier and/or BWP, and/or a set of temporal resources may include at least one of a symbol, slot, and/or subframe.

In some aspects, the UE may determine the at least one resource based on the at least one criteria associated with at least one of the two or more beam pairs between the UE and the base station included in the joint channel. For example, the UE may apply the at least one criteria to the at least one value that is determined (e.g., measured) based on receiving a respective RS from the base station using each of the two or more beam pairs and/or the UE may apply the at least one criteria to multiple candidate resources in order to determine which candidate resources satisfy the at least one criteria.

In some aspects, the UE may determine the at least one resource based on the operational mode so reported resources may be both consistent with the MIMO and/or multiplexing scheme(s) according to which the UE communicates with the base station, and enable adherence to the constraints imposed upon such communication by a use case, such as constraints associated with reliability (e.g., a target BLER) and/or constraints associated with throughput (e.g., a target data rate). As the contexts in which different UEs communicate with different base stations may be diverse, one set of joint channel and/or joint QCL properties and/or characteristics may be more desirable given the at least one operational mode, but less desirable given at least one other operational mode. For example, relatively high throughput at the expense of reliability may be acceptable, or even desirable, in eMBB use cases, but unacceptable in URLLC use cases; therefore, resources selected to support high throughput absent consideration of reliability may be suitable for some eMBB use cases, e.g., in which the aim may be to deliver as much information to as many UEs in the shortest possible amount of time, but unsuitable for some URLLC use cases, e.g., in which relatively high reliability (e.g., relatively low BLER) is expected. Thus, by tying the selection of resources to be reported by the UE to the context in which the resources will be used for communication (e.g., multiplexing mode, MIMO scheme, use case, etc.), the potential for the UE to report resources that are unsuitable and/or prevent some conditions and/or constraints from being supported may be reduced.

In some aspects, the UE may determine the at least one resource by determining whether the at least one value satisfies (e.g., meets or exceeds) the at least one criteria. For example, where the at least one criteria specifies that the at least one resource is to include two beams corresponding to the two highest individual SINR values, the UE may determine each of the individual SINR values for each of the beam pairs based on measuring each of the individual SINR values from the CSI-RSs and/or SSBs received on each of the beam pairs. Then, the UE may compare each of the individual SINR values corresponding to each of the beam pairs to identify the two individual SINR values that are higher than the other individual SINR values. The UE may then determine, as the at least one resource, two beams (e.g., TX beams of the base station) forming the two beam pairs corresponding to highest two individual SINR values.

In another example, where the at least one criteria specifies that the at least one resource is to include two beams corresponding to the highest combined SINR value, the UE may determine each of the combined SINR values for each combination of two beam pairs based on measuring the combined SINR values for each of the combinations of two beam pairs from the CSI-RSs and/or SSBs received on each of the combinations of two beam pairs. Then, the UE may compare each of the combined SINR values corresponding to each of the combinations of two beam pairs to identify the combined SINR value that is highest than the other combined SINR values. The UE may then determine, as the at least one resource, two beams (e.g., two TX beams of the base station) included in the combination of beam pairs corresponding to the highest combined SINR value.

In a further example, where the at least one criteria specifies that the at least one resource is to include two beams estimated to maximize spectral efficiency (e.g., on a joint channel), the UE may determine the spectral efficiency of a respective joint channel including each combination of two beam pairs. The UE may determine which respective joint channel is estimated to maximize spectral efficiency relative to other joint channels including other combinations of two beam pairs. The UE may then determine, as the at least one resource, two beams (e.g., two TX beams of the base station) forming the two beam pairs included in the joint channel estimated to maximize spectral efficiency.

In yet other examples, the at least one criteria may specify one or more properties and/or characteristics associated with the at least one resource that are to be satisfied. For example, the at least one criteria may specific a threshold number of degrees that is the minimum number of degrees two TX beams (e.g., of the base station) and/or two RX beams (e.g., of the UE) of two beam pairs included in a joint channel are to be separated. Potentially, the UE may apply such criteria associated with the at least one resource before applying other criteria associated with performance and/or quality of the (joint) channel including the at least one resource. For example, the UE may first select, from a set of multiple candidate beam pairs, a subset of candidate beam pairs that satisfies the threshold minimum number of degrees separating TX beams (e.g., of the base station) and/or separating RX beams (e.g., of the UE) before determining which of the candidate beam pairs corresponds to the highest individual SINR value or before determining which combination of candidate beam pairs corresponds to the highest combined SINR value.

By way of (non-limiting) illustration, the UE may determine that the at least one operational mode includes an SDM mode and an eMBB use case, e.g., in which the number of spatial streams may be flexible, and correspondingly, the UE may determine that the at least one criteria specifies that the at least one resource is to include at least two beams of two beam pairs that are jointly estimated to maximize throughput relative to other joint combinations of two beam pairs. The at least one criteria may be based on mutual information associated with joint combinations of two beam pairs and/or based on spectral efficiency associated with joint combinations of two beam pairs.

In another illustration, the UE may determine the at least one operational mode includes an SDM mode and a URLLC use case, e.g., in which a single spatial stream is configured, and correspondingly, the UE may determine that the at least one criteria specifies that the at least one resource is to include at least two beams of two beam pairs that are jointly estimated to maximize combined SINR relative to other joint combinations of two beam pairs when the beam separations at both the UE and the base station satisfies a threshold minimum number of degrees. For example, each of a first number of degrees separating two RX beams forming one side of a combination of two beam pairs and a second number of degrees separating two TX beams forming another side of a combination of two beam pairs is to be greater than X degrees, and the combination of those two beam pairs is further to be estimated to maximize combined SINR on a joint channel, e.g., for multi-beam simultaneous TX/RX.

In a further illustration, the UE may determine the at least one operational mode includes an FDM mode and an eMBB use case, and correspondingly, the UE may determine that the at least one criteria specifies that the at least one resource is to include at least two beams of two beam pairs corresponding to the two individual SINR values that are the highest relative to other individual SINR values corresponding to other beam pairs.

In still another illustration, the UE may determine the at least one operational mode includes an FDM mode and a URLLC use case, and correspondingly, the UE may determine that the at least one criteria specifies that the at least one resource is to include at least two beams of two beam pairs corresponding to the two individual SINR values that are the highest relative to other individual SINR values corresponding to other beam pairs when the beam separations at both the UE and the base station satisfies a threshold minimum number of degrees. For example, each of a first number of degrees separating two RX beams forming one side of a combination of two beam pairs and a second number of degrees separating two TX beams forming another side of a combination of two beam pairs is to be greater than X degrees, and each of those two beam pairs is further to correspond to the two highest individual SINR values measured for candidate beam pairs.

The foregoing illustrations are intended to be examples, and it should be appreciated that various multiplexing modes, MIMO schemes, use cases, and/or other operational modes may correspond to various different criteria. For example, various multiplexing modes, MIMO schemes, use cases, and/or other operational modes may have some criteria associated therewith that may be intended to facilitate, enforce, and/or comply with one or more conditions, constraints, and/or configurations expected and/or defined by such multiplexing modes, MIMO schemes, use cases, and/or other operational modes, e.g., in order to adhere to and/or be compatible with some features, functions, and/or configurations for reliability, throughput, QoS, and/or other specifications, standards, and/or metrics.

In the context of FIG. 5, at operation 527, the UE 504 may determine at least one resource 528 associated with communication with the base station 502 on a joint channel based on at least one of the at least one operational mode, which may be determined by the UE 504 as described in connection with to operation 523, and/or the at least one criteria, for at least one value may be determined based on receiving the RSs 526 from the base station 502, as described in connection with operation 525. For example, the UE 504 may determine the at least one resource 528 by selecting two or more beam pairs that satisfy the at least one criteria, which may be commensurate with the at least one operational mode. In other words, according to some examples, the UE 504 may select at least two beams that are determined (e.g., estimated), by the UE 504, to support some joint channel and/or joint QCL properties and/or characteristics that may be desirable for the at least one operational mode according to which the UE 504 and the base station 502 communicate.

At operation 610, the UE may transmit, to the base station, a group-based report associated with the joint channel, and the group-based report may include information indicating the at least one resource. Potentially, the group-based report may include information indicating at least two resources, which may be included in a joint channel, e.g., for multi-beam simultaneous TX/RX and/or another MIMO scheme.

In some aspects, the group-based report may be implemented as a CSI report in which group-based beam reporting is enabled (e.g., the at least one resource may include at least one beam of the base station paired with at least one beam of the UE). For example, the UE may transmit the group-based report to the base station based on a CSI reporting configuration enabling group-based beam reporting received from the base station. Further, the UE may transmit a group-based report including information indicating at least one resource, e.g., according to the CSI reporting configuration and, if applicable, in response to receiving a reporting trigger from the base station—for example, the UE may be configured with semi-persistent scheduling for group-based reporting, and group-based reporting by the UE may be initiated in response to receiving a reporting trigger from the base station, which may be separate from the CSI reporting configuration.

According to various aspects, the information indicating the at least one resource may include at least one indicator (e.g., an RI), ID, and/or index corresponding to the at least one resource. For example, the UE may include at least one CRI and/or SSBRI in the group-based report in order to convey information identifying at least one beam of the base station, e.g., based on at least one CSI-RS and/or SSB transmitted using the at least one beam on a set of CSI-RS and/or SSB resources, respectively, that may be used to identify the at least one beam. The UE may include up to two CRIs and/or SSBRIs per report setting configured by the base station.

In the context of FIG. 5, the UE 504 may transmit the group-based report 530 to the base station 502, e.g., based on the reporting configuration 522. The group-based report 530 may include information indicating the at least one resource 528, e.g., determined by the UE 504 as described in connection with operation 527.

At 612, the UE may receive, from the base station based on the group-based report, information configuring communication with the base station on the joint channel using the at least one resource. In some aspects, the at least one resource may include at least two beams of the base station that may be respectively paired with two beams of the UE—e.g., for joint QCL on a data channel. According to one example configuration, the information configuring communication with the base station on the joint channel using the at least one resource may include information configuring the UE for simultaneous TX/RX on a joint channel including the at least two beams of the UE respectively paired with the at least two beams of the base station. For example, the information configuring communication may configure multiple simultaneous spatial filters of the UE.

According to another example configuration, the information configuring communication with the base station on the joint channel using the at least one resource may include information configuring the UE for non-simultaneous TX/RX on a joint channel including the at least two beams of the UE respectively paired with the at least two beams of the base station. For example, the UE may receive, from the base station, information configuring multiple non-simultaneous spatial filters of the UE and/or information indicating a TDM configuration on the joint channel, which may indicate a first set of time resources on which the UE is to use one beam pair and a second set of time resources on which the UE is to use another beam pair.

Additionally or alternatively, the information configuring communication with the base station on the joint channel using the at least one resource may include information scheduling communication between the base station and the UE on the joint channel that includes at least two beams of the base station respectively paired with at least two beams of the UE. For example, the UE may receive, from the base station, a schedule and/or allocation indicating a set of time and/or frequency resources for downlink or uplink communication. The schedule may indicate time and/or frequency resources on which the UE is to use at least two beam pairs configured between the base station and the UE (e.g., for simultaneous TX/RX), or the schedule may indicate one set of time and/or frequency resources on which the UE is to use one of the at least two beam pairs and another set of time and/or frequency resources on which the UE is to use another of the at least two beam pairs.

In the context of FIG. 5, the UE 504 may receive, from the base station 502 based on the group-based report 530, a joint channel communication configuration 532 configuring communication between the UE 504 and the base station 502 on a joint channel that includes the at least one resource 528. For example, the UE 504 may determine (e.g., adjust, alter, set, etc.) one or more transmission parameters for communication with the base station 502 on the joint channel in response to receiving the joint channel communication configuration 532.

At 614, the UE may communicate with the base station on the joint channel based on the information configuring the communication with the base station on the joint channel using the at least one resource. In some aspects, the communication may be downlink communication, and the UE may receive downlink data and/or downlink control information from the base station on the joint channel using the at least one resource. For example, the UE may receive downlink data and/or downlink control information using at least two beam pairs configured between the UE and the base station, such as by using multiple RX spatial filters, which may be simultaneous or non-simultaneous. Further, the UE may receive downlink data and/or downlink control information on a set of time and/or frequency resources configured by the base station for the UE, e.g., based on the group-based report.

In some other aspects, the communication may be uplink communication, and the UE may transmit uplink data and/or uplink control information to the base station on the joint channel using the at least one resource. For example, the UE may transmit uplink data and/or uplink control information using at least two beam pairs configured between the UE and the base station, such as when beam reciprocity is supported. Potentially, the UE may transmit uplink data and/or uplink control information on a set of time and/or frequency resources configured by the base station for the UE, e.g., based on the group-based report.

In the context of FIG. 5, the UE 504 may communicate 534 with the base station 502 on the joint channel based on the joint channel communication configuration 532 received from the base station 502. For example, the UE 504 may transmit or receive data and/or control information using at least one resource with which the UE 504 is configured according to the joint channel communication configuration 532. Illustratively, the at least one resource may include two beams of two beam pairs, which may be respectively paired with two other beams of the two beam pairs, and the communication 534 by the UE 504 with the base station 502 may include simultaneous TX/RX using the two beam pairs included in the joint channel or the communication 534 by the UE 504 with the base station 502 may include non-simultaneous TX/RX with TDM using the two beam pairs included in the joint channel.

Figure 7:
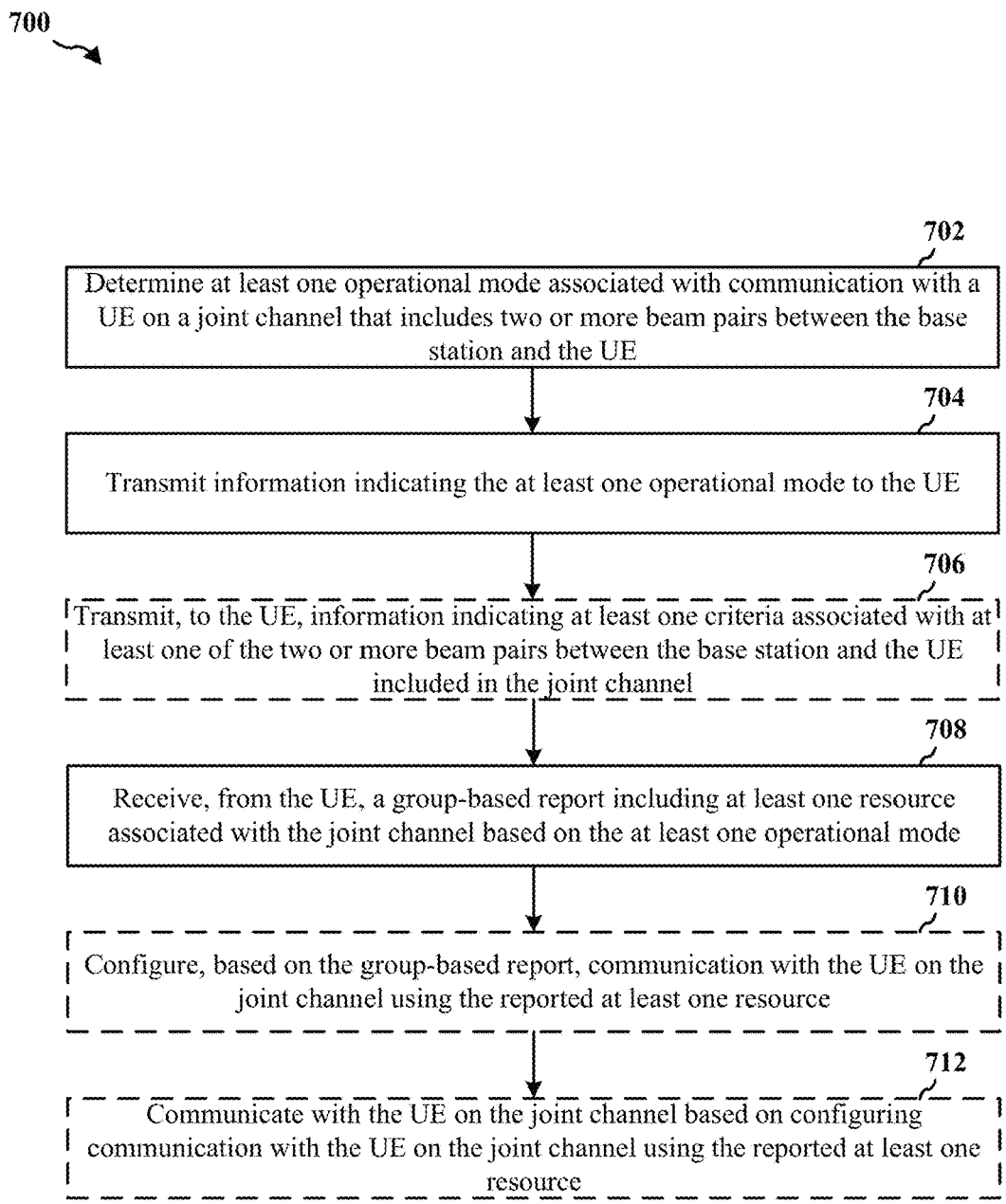
FIG. 7 is a flowchart of an example method of wireless communication that may be performed with a base station and/or other apparatus, in accordance with various aspects of the present disclosure.

FIG. 7 is a flowchart of a method 700 of wireless communication. The method 700 may be performed by a base station or a component of a base station. For example, in the context of FIGS. 1 and 3-5, the method 700 may be performed by at least one of a base station 102/180, 310, 402, 502; a processing system, which may include the memory 376 and which may be the entire base station 102/180, 310, 402, 502, or a component of the base station 102/180, 310, 402, 502, for example, at least one processor, such as the TX processor 316, the RX processor 370, and/or the controller/processor 375; and/or an apparatus, such as an apparatus 902, described infra. According to various different aspects, one or more of the illustrated blocks of the method 700 may be transposed, omitted, and/or contemporaneously performed.

The method 700 may enable a base station configure a UE for group-based reporting according to which the UE determines at least one resource (e.g., a group of resources) to be reported to the base station in order for the base station to configure communication with the UE a joint channel. The method 700 may improve beam management for TX/RX using multiple beams while reducing the overhead (e.g., signaling, processing, etc.) and/or errors that may otherwise be commensurate with group-based beam reporting that includes additional CSI reporting for joint QCL and/or group-based beam reporting when the UE is agnostic to or unaware of the context in which the group-based beam reporting is to be used by the base station.

At 702, a base station may determine at least one operational mode associated with communication with a UE on a joint channel that includes two or more beam pairs between the UE and the base station. In some aspects, the at least one operational mode may include at least one of a multiplexing mode and/or a use case associated with communication between the base station and the UE. For example, the base station may determine the at least one operational mode to include at least one of an SDM mode, an FDM mode, a TDM mode, an eMBB use case, and/or a URLLC use case.

In some other aspects, the at least one operational mode may be associated with one or more properties and/or characteristics expected and/or enforced on a joint channel, such as at least one property and/or characteristic that is to be prioritized over at least one other property and/or characteristic. For example, the at least one operational mode may be associated with relatively high throughput on a joint channel, and so throughput on the joint channel may be prioritized over reliability on the joint channel (or vice versa).

In the context of FIG. 5, at operation 521, the base station 502 may determine at least one operational mode associated with communication with the UE 504 on the joint channel. For example, the base station 502 may determine the at least one operational mode based on characteristics and/or capabilities of the UE 504, such as a type of the UE 504, capability of the UE 504 to receive multiple simultaneous spatial streams.

At 704, the base station may transmit, to the UE, information indicating the at least one operational mode associated with communication with the UE on the joint channel. According to various aspects, the information indicating the at least one operational mode may be transmitted via one of RRC signaling, at least one MAC CE, and/or DCI. For example, the information indicating the at least one operational mode may be transmitted to the UE in a reporting configuration (e.g., CSI reporting configuration) in which group-based beam reporting is enabled.

In some aspects, the information indicating the at least one operational mode may include a respective value of each of a set of RRC parameters associated with the at least one operational mode. A set of respective values of a set of RRC parameters may be configured for at least one of a number of TCI states, a number of CDM groups, a repetition number associated with a URLLC use case, and/or a configuration for a scheme enabler associated with the URLLC use case.

For example, the base station may configure the set of respective values of the set of RRC parameters such that a combination of the set of respective values (and/or a combination of a subset of the set of respective values) indicates at least one operational mode that includes a multiplexing mode combined with a use case. Illustratively, a first combination of a set of respective values of a set of RRC parameters may indicate an SDM mode in combination with an eMBB use case, whereas a second combination of a set of respective values of a set of RRC parameters may indicate an SDM mode in combination with a URLLC use case. Similarly, third combination of a set of respective values of a set of RRC parameters may indicate an FDM mode in combination with an eMBB use case, whereas a fourth combination of a set of respective values of a set of RRC parameters may indicate an FDM mode in combination with a URLLC use case.

In the context of FIG. 5, the base station 502 may transmit, to the UE 504, the at least one indication 524 indicating at least one operational mode associated with communication with the UE 504 on a joint channel that includes two or more beam pairs between the base station 502 and the UE 504. In some aspects, the base station 502 may transmit the at least one indication 524 to the UE 504 in the reporting configuration 522 (e.g., CSI reporting configuration), which may enable group-based beam reporting for the UE 504.

At 706, the base station may transmit, to the UE, information indicating at least one criteria associated with communication with the UE on the joint channel. Specifically, the at least one criteria may be associated with at least one of two or more beam pairs between the base station and the UE. The at least one criteria may be used by the UE for selection of resources to be reported by the UE in a group-based report.

In particular, the at least one criteria may be associated with selection of resources to be reported by the UE that may provide some satisfactory (e.g., acceptable or "good") quality and/or performance for a joint channel and/or joint QCL (e.g., multi-beam simultaneous TX/RX). For example, the at least one criteria may be based on at least one of a capacity associated with the joint channel, mutual information associated with the joint channel, a spectral efficiency associated with the joint channel, an RSRP associated with at least one of the two or more beam pairs, an SINR associated with at least one of the two or more beam pairs, and/or a beam separation associated with the two or more beam pairs.

According to various aspects, the information indicating the at least one operational mode may be transmitted via one of RRC signaling, at least one MAC CE, and/or DCI. For example, the information indicating the at least one operational mode may be transmitted to the UE in a reporting configuration (e.g., CSI reporting configuration) in which group-based beam reporting is enabled.

In the context of FIG. 5, the base station 502 may transmit, to the UE 504, the at least one indication 524 indicating at least one criteria associated with communication with the UE 504 on a joint channel. In some aspects, the base station 502 may transmit the at least one indication 524 to the UE 504 in the reporting configuration 522 (e.g., CSI reporting configuration), which may enable group-based beam reporting for the UE 504.

At 708, the base station may receive, from the UE, a group-based report including at least one resource associated with the joint channel based on the at least one operational mode. Potentially, the at least one resource may be additionally or alternatively based on the at least one criteria. The at least one resource included in the group-based report may include at least one of a set of spatial resources, a set of time resources, and/or a set of frequency resources. For example, a set of spatial resources may include at least one beam (e.g., identified by a CRI and/or an SSBRI) of at least one beam pair between the UE and the base station, a set of frequency resources may include at least one subcarrier and/or BWP, and/or a set of temporal resources may include at least one of a symbol, slot, and/or subframe. In some aspects, the group-based report may include a CSI report, which may be received by the base station based on a CSI reporting configuration transmitted to the UE.

According to some aspects, the group-based report may include measurement information corresponding to the at least one resource. Potentially, the measurement information may be associated with the at least one criteria. For example, the at least one resource may be included in the group-based report by virtue of the measurement information satisfying the at least one criteria.

The measurement information may include one or more measurement values, which may be indicative of quality and/or performance of the at least one resource individually or jointly with at least two resources of the at least one resource. For example, the measurement information may include one or more individual SINR values and/or individual RSRP values respectively corresponding to the at least one resource. Additionally or alternatively, the measurement information may include one or more combined SINR values, combined RSRP values, and/or combined throughput values corresponding to at least two resources of the at least one resource, such as at least two resources included in a joint channel and/or with joint QCL.

In the context of FIG. 5, the base station 502 may receive the group-based report 530 from the UE 504, e.g., based on the reporting configuration 522. The group-based report 530 may include information indicating the at least one resource 528, e.g., determined by the UE 504 as described in connection with operation 527.

At 710, the base station may configure communication with the UE on the joint channel using the at least one resource based on the group-based report. In some aspects, the at least one resource may include at least two beams of the base station that may be respectively paired with two beams of the UE—e.g., for joint QCL on a data channel. According to one example configuration, the base station may configure communication with the UE on the joint channel using the at least one resource by configuring the UE for simultaneous TX/RX on a joint channel including the at least two beams reported by the UE respectively paired with the at least two other beams. For example, the base station may configure multiple simultaneous spatial filters of the UE based on the at least one resource included in the group-based report.

According to another example configuration, the base station may configure communication with the UE on the joint channel using the at least one resource by configuring the UE for non-simultaneous TX/RX on a joint channel including at least two beams reported by the UE respectively paired with at least two other beams. For example, the base station may configure multiple non-simultaneous spatial filters of the UE and/or information indicating a TDM configuration on the joint channel, which may indicate a first set of time resources on which the UE is to use one beam pair and a second set of time resources on which the UE is to use another beam pair.

Additionally or alternatively, the base station may configure communication with the UE on the joint channel using the at least one resource by scheduling communication between the base station and the UE on the joint channel that includes at least two beams of the base station respectively paired with at least two beams of the UE. For example, the base station may schedule and/or allocate a set of time and/or frequency resources for downlink or uplink communication. The schedule may indicate time and/or frequency resources on which the UE is to use at least two beam pairs configured between the UE and the base station (e.g., for simultaneous TX/RX), or the schedule may indicate one set of time and/or frequency resources on which the UE is to use one of at least two beam pairs and another set of time and/or frequency resources on which the UE is to use another of at least two beam pairs.

In the context of FIG. 5, at operation 529, the base station 502 may configure, based on the group-based report 530, communication with the UE 504 on a joint channel using the at least one resource 528. In order to configure the UE 504 for communication with the base station 502 on the joint channel, the base station 502 may transmit a joint channel communication configuration 532 to the UE 504.

At 712, the base station may communicate with the UE on the joint channel based on configuring the communication with the UE on the joint channel using the reported at least one resource. In some aspects, the communication may be downlink communication, and the base station may transmit downlink data and/or downlink control information to the UE on the joint channel using the at least one resource. For example, the base station may transmit downlink data and/or downlink control information using at least two beam pairs configured between the base station and the UE, e.g., for simultaneous TX/RX or non-simultaneous TX/RX with TDM. Further, the base station may transmit downlink data and/or downlink control information on a set of time and/or frequency resources configured by the base station for the UE, e.g., based on the group-based report.

In some other aspects, the communication may be uplink communication, and the base station may receive uplink data and/or uplink control information from the UE on the joint channel using the at least one resource. For example, the base station may receive uplink data and/or uplink control information using at least two beam pairs configured between the base station and the UE, such as when beam reciprocity is supported. Potentially, the base station may receive uplink data and/or uplink control information on a set of time and/or frequency resources configured by the base station for the UE, e.g., based on the group-based report.

In the context of FIG. 5, the base station 502 may communicate 534 with the UE 504 on the joint channel based on configuring communication with the UE 504 on the joint channel, as described in connection with operation 529. In particular, the base station 502 may communicate 534 with the UE 504 on the joint channel according to the joint channel communication configuration 532 transmitted by the base station 502 to the UE 504. For example, the base station 502 may transmit or receive data and/or control information using at least one resource configured by the base station 502, e.g., as indicated by the joint channel communication configuration 532. Illustratively, the at least one resource may include two beams of two beam pairs, which may be respectively paired with two other beams of the two beam pairs, and the communication 534 by the base station 502 with the UE 504 may include simultaneous TX/RX using the two beam pairs included in the joint channel or the communication 534 by the base station 502 with the UE 504 may include non-simultaneous TX/RX with TDM using the two beam pairs included in the joint channel.

Figure 8:
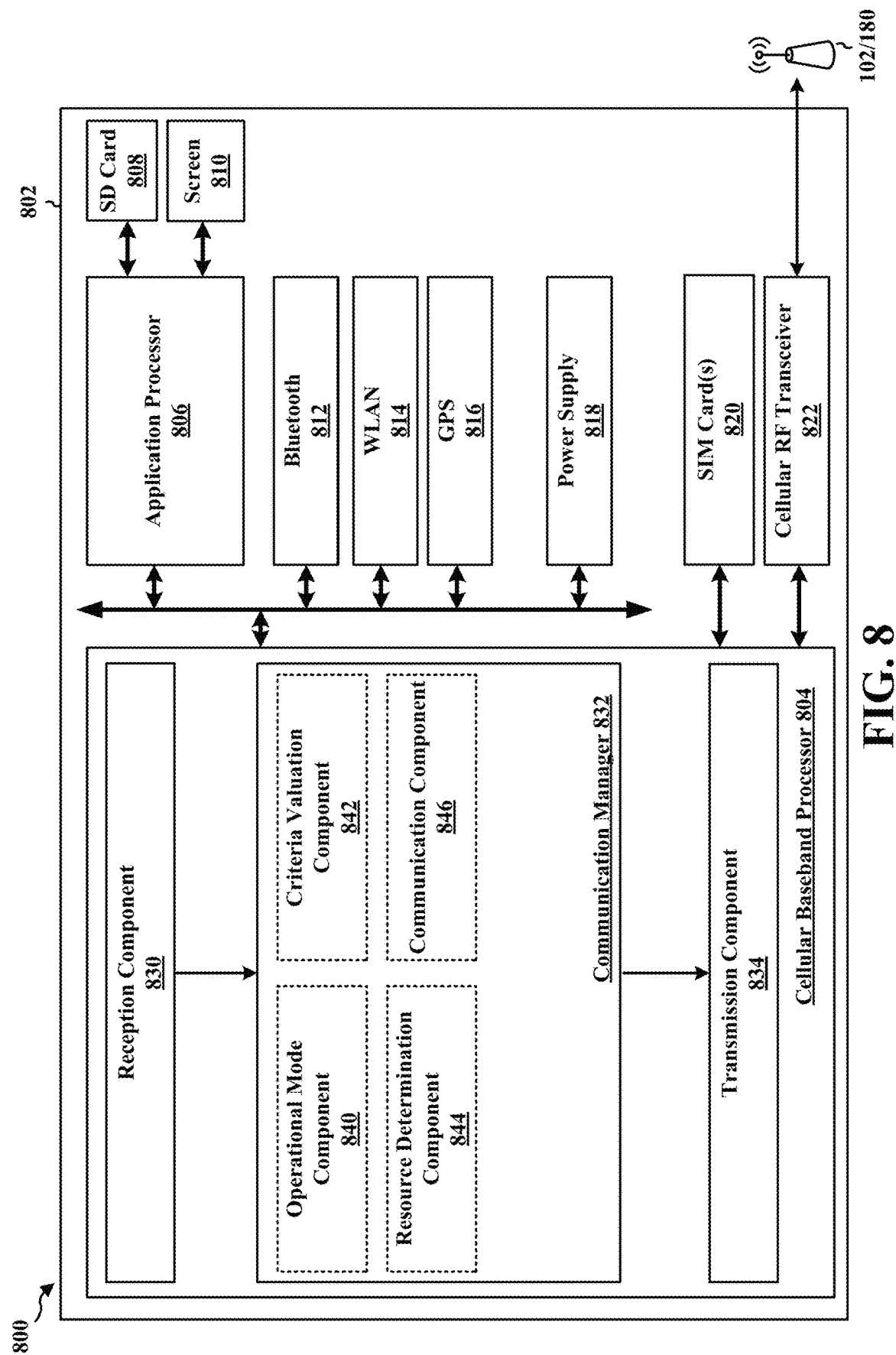
FIG. 8 is a diagram illustrating an example of a hardware implementation for an example apparatus, in accordance with various aspects of the present disclosure.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or base station 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the aforediscussed additional modules of the apparatus 802.

The reception component 830 may be configured to receive, from the base station 102/180, information indicating at least one of at least one operational mode and/or at least one criteria, e.g., as described in connection with 602 of FIG. 6. The at least one of the at least one operational mode and/or the at least one criteria may be associated with communication with the base station 102/180 on a joint channel that includes at least two beam pairs between the apparatus 802 and the base station 102/180.

The communication manager 832 may include an operational mode component 840 that may be configured to determine at least one operational mode associated with communication with the base station 102/180 on a joint channel that includes two or more beam pairs between the apparatus 802 and the base station 102/180, e.g., as described in connection with 604 of FIG. 6. The at least one operational mode may include at least one of a multiplexing mode and/or a use case. For example, the at least one of the multiplexing mode and/or the use case may include at least one of an SDM mode, a TDM mode, an FDM mode, an eMBB use case, and/or a URLLC use case.

In some aspects, the operational mode component 840 may receive, as input(s) from the reception component 830, the information indicating the at least one of the at least one operational mode and/or the at least one criteria. The operational mode component 840 may be configured to determine the at least one operational mode based on the information indicating the at least one of the at least one operational mode and/or the at least one criteria.

For example, the information indicating the at last one of the at least one operational mode and/or the at least one criteria may include a respective value of each of a set of RRC parameters associated with the at least one operational mode. Illustratively, the respective values of the set of RRC parameters may include at least one of a number of TCI states, a number of CDM groups, a URLLC repetition numbers, and/or a configuration of a URLLC scheme enabler.

The communication manager 832 may further include a criteria valuation component 842 that may be configured to determine at least one value of at least one criteria based on receiving a respective RS from the base station 102/180 using each of two or more beam pairs between the apparatus 802 and the base station 102/180, e.g., as described in connection with 606 of FIG. 6. A respective RS may include at least one of a CSI-RS and/or an SSB transmitted on one beam pair.

The at least one criteria may be based on at least one of a capacity associated with the joint channel, mutual information associated with the joint channel, a spectral efficiency associated with the joint channel, an RSRP associated with at least one of the two or more beam pairs, an SINR associated with at least one of the two or more beam pairs, and/or a beam separation associated with the two or more beam pairs.

In some aspects, the criteria valuation component 842 may receive, as input(s) from the reception component 830, the information indicating the at least one of the at least one operational mode and/or the at least one criteria. The criteria valuation component 842 may be configured to determine the at least one value of the at least one criteria based on the information indicating the at least one of the at least one operational mode and/or the at least one criteria.

The communication manager 832 may further include a resource determination component 844 that may be configured to determine at least one resource associated with communication with the base station 102/180 on the joint channel based on at least one of the at least one operational mode and/or the at least one criteria, e.g., as described in connection with 608 of FIG. 6. According to various aspects, the at least one resource may include at least one of a set of spatial resources, a set of frequency resources, and/or a set of temporal resources.

The transmission component 834 may receive, as input(s) from the resource determination component 844, information indicating the at least one resource. The transmission component 834 may be configured to transmit, to the base station 102/180, a group-based report associated with the joint channel and including the information indicating the at least one resource, e.g., as described in connection with 610 of FIG. 6.

The reception component 830 may be further configured to receive, from the base station 102/180 based on the group-based report, information configuring communication with the base station 102/180 on the joint channel using the at least one resource, e.g., as described in connection with 612 of FIG. 6.

The communication manager 832 may further include a communication component 846 that may be configured to communicate with the base station 102/180 on the joint channel based on the information configuring the communication with the base station 102/180 on the joint channel using the at least one resource, e.g., as described in connection with 614 of FIG. 6. The communication component 846 may receive, as input(s) from the reception component 830, the information configuring communication with the base station 102/180 on the joint channel using the at least one resource.

The apparatus 802 may include additional components that perform some or all of the blocks, operations, signaling, etc. of the algorithm(s) in the aforementioned call flow diagram of FIG. 5 and/or flowchart of FIG. 6. As such, some or all of the blocks, operations, signaling, etc. in the aforementioned call flow diagram of FIG. 5 and/or flowchart of FIG. 6 may be performed by a component and the apparatus 802 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for determining at least one operational mode associated with communication with a base station on a joint channel that includes two or more beam pairs between the apparatus 802 and the base station; means for determining at least one resource associated with the communication with the base station on the joint channel based on the at least one operational mode; and means for transmitting, to the base station, a group-based report associated with the joint channel, the group-based report including information indicating the at least one resource.

In one aspects, the at least one operational mode includes at least one of a multiplexing mode or a use case. In one aspect, the at least one of the multiplexing mode or the use case includes at least one of an SDM mode, an FDM mode, a TDM mode, an eMBB use case, or a URLLC use case. In one aspect, the at least one resource includes at least one of a set of spatial resources, a set of frequency resources, or a set of temporal resources. In one aspect, the at least one resource is determined further based on at least one criteria associated with at least one of the two or more beam pairs between the apparatus 802 and the base station included in the joint channel.

In one aspect, the at least one criteria is based on at least one of a capacity associated with the joint channel, mutual information associated with the joint channel, a spectral efficiency associated with the joint channel, an RSRP associated with the at least one of the two or more beam pairs, an SINR associated with the at least one of the two or more beam pairs, or a beam separation associated with the two or more beam pairs.

In one aspect, the apparatus 802, and in particular the cellular baseband processor 804, may further include means for determining at least one value of the at least one criteria based on receiving a respective reference signal from the base station using each of the two or more beam pairs, and the at least one resource is determined further based on the at least one value of the at least one criteria.

In one aspect, the apparatus 802, and in particular the cellular baseband processor 804, may further include means for receiving, from the base station, information indicating at least one of the at least one operational mode or the at least one criteria.

In one aspect, the information indicating the at least one of the at least one operational mode or the at least one criteria includes a respective value of each of a set of RRC parameters associated with the at least one operational mode. In one aspect, the respective values of the set of RRC parameters includes at least one of a number of TCI states, a number of CDM groups, a repetition number associated with a URLLC use case, or a configuration for a scheme enabler associated with the URLLC use case.

In one aspect, the apparatus 802, and in particular the cellular baseband processor 804, may further include means for receiving, from the base station based on the group-based report, information configuring communication with the base station on the joint channel using the at least one resource; and means for communicating with the base station on the joint channel based on the information configuring the communication with the base station on the joint channel using the at least one resource.

The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
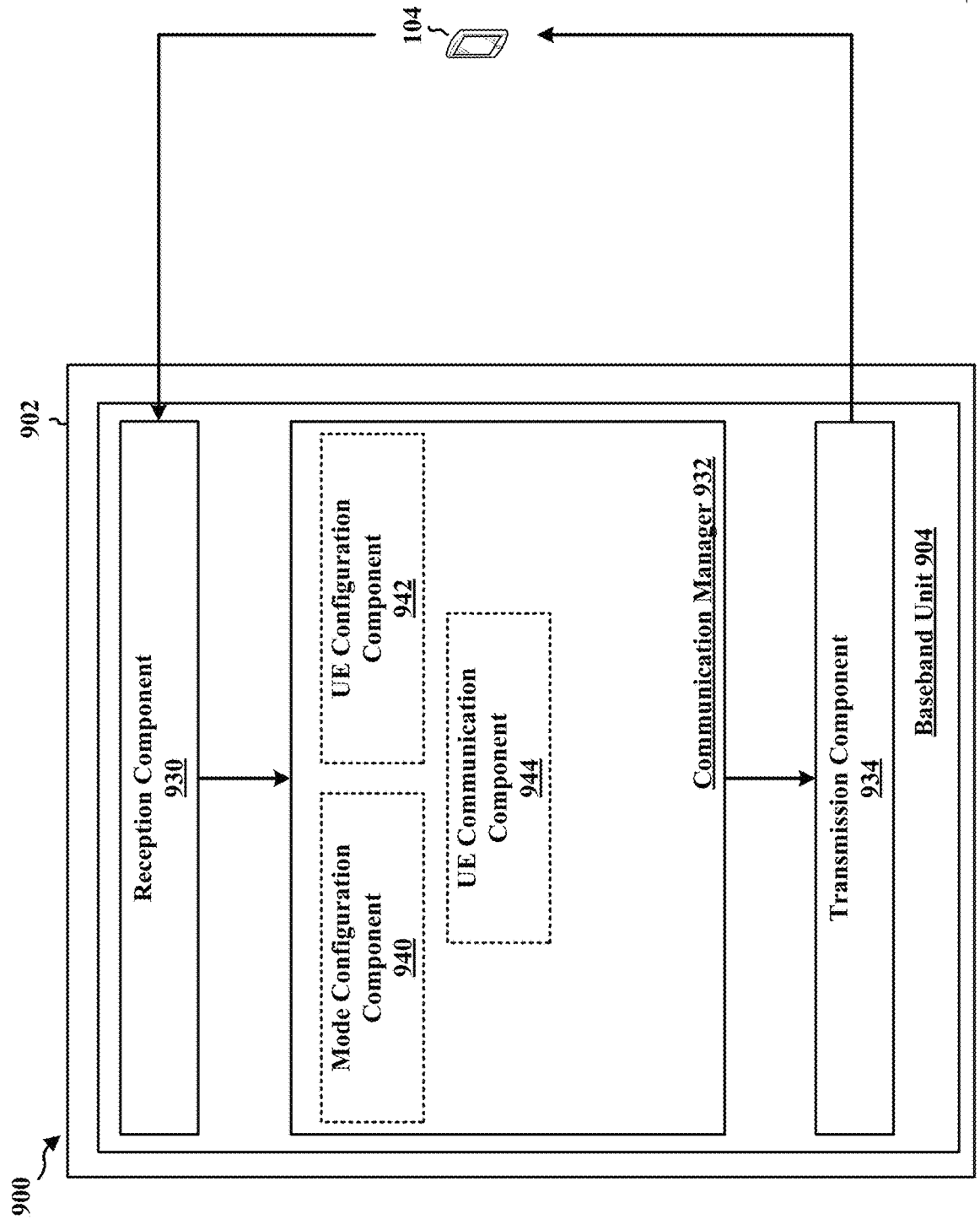
FIG. 9 is a diagram illustrating another example of a hardware implementation for another example apparatus, in accordance with various aspects of the present disclosure.

FIG. 9 is a diagram 900 illustrating an example of a hardware implementation for an apparatus 902. The apparatus 902 is a base station and includes a baseband unit 904. The baseband unit 904 may communicate through a cellular RF transceiver with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the base station 310 and may include the memory 376 and/or at least one of the TX processor 316, the RX processor 370, and the controller/processor 375.

The communication manager 932 may include a mode configuration component 940 that may be configured to determine at least one operational mode associated with communication with a UE 104 on a joint channel that includes two or more beam pairs between the apparatus 902 and the UE 104, e.g., as described in connection with 702 of FIG. 7.

According to various aspects, the at least one operational mode may include at least one of a multiplexing mode and/or a use case. For example, the at least one of the multiplexing mode and/or the use case may include at least one of an SDM mode, an FDM mode, a TDM mode, an eMBB use case, and/or a URLLC use case.

The transmission component 934 may be configured to transmit information indicating the at least one operational mode to the UE 104, e.g., as described in connection with 704 of FIG. 7. For example, the transmission component 934 may receive, as input(s) from the mode configuration component 940, information indicating the at least one operational mode.

In some aspects, the information indicating the at least one operational mode may include a respective value of each of a set of RRC parameters. For example, the respective values of the set of RRC parameters may include at least one of a number of TCI states, a number of CDM groups, a URLLC repetition number, and/or a configuration of a URLLC scheme enabler.

The transmission component 934 may be further configured to transmit, to the UE 104, information indicating at least one criteria associated with at least one of the two or more beam pairs between the apparatus 902 and the UE 104 included in the joint channel, e.g., as described in connection with 706 of FIG. 7. According to various aspects, the at least one criteria is based on at least one of a capacity associated with the joint channel, mutual information associated with the joint channel, an RSRP associated with the at least one of the two or more beam pairs, an SINR associated with the at least one of the two or more beam pairs, and/or a beam separation associated with the two or more beam pairs.

The reception component 930 may be configured to receive, from the UE 104, a group-based report including at least one resource associated with the joint channel based on the at least one operational mode, e.g., as described in connection with 708 of FIG. 7.

The communication manager 932 may further include a UE configuration component 942 that may be configured to configure, based on the group-based report, communication with the UE 104 on the joint channel using the reported at least one resource, e.g., as described in connection with 710 of FIG. 7. The UE configuration component 942 may receive, as input(s) from the reception component 930, the group-based report including the at least one resource associated with the joint channel based on the at least one operational mode.

In some aspects, the at least one resource includes at least one of a set of spatial resources, a set of frequency resources, or a set of temporal resources. In some other aspects, the at least one resource is based on the at least one criteria associated with at least one of the two or more beam pairs between the apparatus 902 and the UE 104 included in the joint channel.

The communication manager 932 may further include a UE communication component 944 that may be configured to communicate with the UE 104 on the joint channel based on configuring the communication with the UE 104 on the joint channel using the at least one resource, e.g., as described in connection with 712 of FIG. 7. In some aspects, the UE communication component 944 may be configured to receive, as input(s) from the UE configuration component 942, information indicating the configuration of the communication with the UE 104 on the joint channel using the reported at least one resource.

The apparatus 902 may include additional components that perform some or all of the blocks, operations, signaling, etc. of the algorithm(s) in the aforementioned call flow diagram of FIG. 5 and/or flowchart of FIG. 7. As such, some or all of the blocks, operations, signaling, etc. in the aforementioned call flow diagram of FIG. 5 and/or flowchart of FIG. 7 may be performed by a component and the apparatus 902 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for determining at least one operational mode associated with communication with a UE on a joint channel that includes two or more beam pairs between the apparatus 902 and the UE; means for transmitting information indicating the at least one operational mode to the UE; and means for receiving, from the UE, a group-based report including at least one resource associated with the joint channel based on the at least one operational mode.

In one aspect, the at least one operational mode includes at least one of a multiplexing mode or a use case. In one aspect, the at least one of the multiplexing mode or the use case includes at least one of a TDM mode, an FDM mode, an SDM mode, an eMBB use case, or a URLLC use case. In one aspect, the at least one resource includes at least one of a set of spatial resources, a set of frequency resources, or a set of temporal resources.

In one aspect, the at least one resource is further based on at least one criteria associated with at least one of the two or more beam pairs between the apparatus 902 and the UE included in the joint channel. In one aspect, the at least one criteria is based on at least one of a capacity associated with the joint channel, mutual information associated with the joint channel, a RSRP associated with the at least one of the two or more beam pairs, a SINR associated with the at least one of the two or more beam pairs, or a beam separation associated with the two or more beam pairs.

In one aspect, the apparatus 902, and in particular the baseband unit 904, may further include means for transmitting information indicating the at least one criteria to the UE. In one aspect, the information indicating the at least one operational mode includes a respective value of each of a set of RRC parameters. In one aspect, the respective values of the set of RRC parameters includes at least one of a number of TCI states, a number of CDM groups, a repetition number associated with a URLLC use case, or a configuration for a scheme enabler associated with the URLLC use case.

In one aspect, the apparatus 902, and in particular the baseband unit 904, may further include means for configuring, based on the group-based report, communication with the UE on the joint channel using the at least one resource; and means for communicating with the UE on the joint channel based on configuring the communication with the UE on the joint channel using the at least one resource.

The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is an apparatus of a UE configured to determine at least one operational mode associated with communication with a base station on a joint channel that includes two or more beam pairs between the UE and the base station; determine at least one resource associated with the communication with the base station on the joint channel based on the at least one operational mode; and transmit, to the base station, a group-based report associated with the joint channel, the group-based report including information indicating the at least one resource.

Example 2 is the apparatus of Example 1, and the at least one operational mode comprises at least one of a multiplexing mode or a use case.

Example 3 is the apparatus of any of Examples 1 and 2, and the at least one of the multiplexing mode or the use case comprises at least one of a TDM mode, an FDM mode, an SDM mode, an eMBB use case, or a URLLC use case.

Example 4 is the apparatus of any of Examples 1 through 3, and the at least one resource comprises at least one of a set of spatial resources, a set of frequency resources, or a set of temporal resources.

Example 5 is the apparatus of any of Examples 1 through 4, and the at least one resource is determined further based on at least one criteria associated with at least one of the two or more beam pairs between the UE and the base station included in the joint channel.

Example 6 is the apparatus of Example 5, and the at least one criteria is based on at least one of a capacity associated with the joint channel, mutual information associated with the joint channel, a spectral efficiency associated with the joint channel, a RSRP associated with the at least one of the two or more beam pairs, an SINR associated with the at least one of the two or more beam pairs, or a beam separation associated with the two or more beam pairs.

Example 7 is the apparatus of any of Examples 5 and 6, and further configured to determine at least one value of the at least one criteria based on receiving a respective reference signal from the base station using each of the two or more beam pairs, and the at least one resource is determined further based on the at least one value of the at least one criteria.

Example 8 is the apparatus of any of Examples 5 and 7, and further configured to receive, from the base station, information indicating at least one of the at least one operational mode or the at least one criteria.

Example 9 is the apparatus of Example 8, and the information indicating the at least one of the at least one operational mode or the at least one criteria comprises a respective value of each of a set of RRC parameters associated with the at least one operational mode.

Example 10 is the apparatus of any of Examples 8 and 9, and the respective values of the set of RRC parameters comprises at least one of a number of TCI states, a number of CDM groups, a repetition number associated with a URLLC use case, or a configuration for a scheme enabler associated with the URLLC use case.

Example 11 is the apparatus of any of Examples 1 through 10, and further configured to receive, from the base station based on the group-based report, information configuring communication with the base station on the joint channel using the at least one resource; and communicate with the base station on the joint channel based on the information configuring the communication with the base station on the joint channel using the at least one resource.

Example 12 is an apparatus of a base station configured to determine at least one operational mode associated with communication with a UE on a joint channel that includes two or more beam pairs between the base station and the UE; transmit information indicating the at least one operational mode to the UE; and receive, from the UE, a group-based report including at least one resource associated with the joint channel based on the at least one operational mode.

Example 13 is the apparatus of Example 12, and the at least one operational mode comprises at least one of a multiplexing mode or a use case.

Example 14 is the apparatus of Example 13, and the at least one of the multiplexing mode or the use case comprises at least one of a TDM mode, an FDM mode, an SDM mode, an eMBB use case, or a URLLC use case.

Example 15 is the apparatus of any of Examples 12 through 14, and the at least one resource comprises at least one of a set of spatial resources, a set of frequency resources, or a set of temporal resources.

Example 16 is the apparatus of any of Examples 12 through 15, and the at least one resource is further based on at least one criteria associated with at least one of the two or more beam pairs between the base station and the UE included in the joint channel.

Example 17 is the apparatus of Example 16, and the at least one criteria is based on at least one of a capacity associated with the joint channel, mutual information associated with the joint channel, a RSRP associated with the at least one of the two or more beam pairs, a SINR associated with the at least one of the two or more beam pairs, or a beam separation associated with the two or more beam pairs.

Example 18 is the apparatus of any of Examples 16 and 17, and further configured to transmit information indicating the at least one criteria to the UE.

Example 19 is the apparatus of any of Examples 12 through 18, and the information indicating the at least one operational mode comprises a respective value of each of a set of RRC parameters.

Example 20 is the apparatus of Example 19, and the respective values of the set of RRC parameters comprises at least one of a number of TCI states, a number of CDM groups, a repetition number associated with a URLLC use case, or a configuration for a scheme enabler associated with the URLLC use case.

Example 21 is the apparatus of any of Examples 12 through 20, and further configured to configure, based on the group-based report, communication with the UE on the joint channel using the at least one resource; and communicate with the UE on the joint channel based on configuring the communication with the UE on the joint channel using the at least one resource.

What is claimed is:

1. A method of wireless communication at a user equipment (UE), comprising:
   determining at least one operational mode including at least a multiplexing mode and a use case associated with communication with a base station on a joint channel that includes two or more beam pairs between the UE and the base station;

determining at least one resource associated with the communication with the base station on the joint channel based on the at least one operational mode and at least two or more criteria associated with at least one of the two or more beam pairs between the UE and the base station included in the joint channel, wherein the at least two or more criteria are each different criteria; and transmitting, to the base station, a group-based report associated with the joint channel, the group-based report including information indicating the at least one resource and the at least two or more criteria.

2. The method of claim 1, wherein the multiplexing mode comprises at least a time-division multiplexing (TDM) mode, a frequency-division multiplexing (FDM) mode, or a spatial-division multiplexing (SDM) mode, and the use case comprises at least an enhanced mobile broadband (eMBB) use case, or an ultra-reliable low-latency communication (URLLC) use case.

3. The method of claim 1, wherein the at least one resource comprises at least one of a set of spatial resources, a set of frequency resources, or a set of temporal resources.

4. The method of claim 1, wherein the at least one resource is determined further based on at least one of the at least two or more criteria associated with at least one of the two or more beam pairs between the UE and the base station included in the joint channel.

5. The method of claim 4, wherein the at least two or more criteria are each based on at least one of a capacity associated with the joint channel, mutual information associated with the joint channel, a spectral efficiency associated with the joint channel, a reference signal receive power (RSRP) associated with the at least one of the two or more beam pairs, a signal-to-interference-plus-noise ratio (SINR) associated with the at least one of the two or more beam pairs, or a beam separation associated with the two or more beam pairs.

6. The method of claim 4, further comprising:
determining at least one value of the at least two or more criteria based on receiving a respective reference signal from the base station using each of the two or more beam pairs,
wherein the at least one resource is determined further based on the at least one value of the at least two or more criteria.

7. The method of claim 4, further comprising:
receiving, from the base station, information indicating at least one of the at least one operational mode and the at least two or more criteria.

8. The method of claim 7, wherein the information indicating the at least one of the at least one operational mode and the at least one of the two or more criteria comprises a respective value of each of a set of radio resource control (RRC) parameters associated with the at least one operational mode.

9. The method of claim 8, wherein the respective values of the set of RRC parameters comprises at least one of a number of transmission configuration indication (TCI) states, a number of code-division multiplexing (CDM) groups, a repetition number associated with an ultra-reliable low-latency communication (URLLC) use case, or a configuration for a scheme enabler associated with the URLLC use case.

10. The method of claim 1, further comprising:
receiving, from the base station based on the group-based report, information configuring communication with the base station on the joint channel using the at least one resource; and
communicating with the base station on the joint channel based on the information configuring the communication with the base station on the joint channel using the at least one resource.

11. A method of wireless communication at a base station, comprising:
determining at least one operational mode including at least a multiplexing mode and a use case associated with communication with a user equipment (UE) on a joint channel that includes two or more beam pairs between the base station and the UE;
transmitting, to the UE, information indicating the at least one operational mode and at least two or more criteria associated with at least one of the two or more beam pairs between the UE and the base station included in the joint channel, wherein the at least two or more criteria are each different criteria; and
receiving, from the UE, a group-based report including at least one resource associated with the joint channel based on the at least one operational mode and the at least two or more criteria.

12. The method of claim 11, wherein the multiplexing mode comprises at least a time-division multiplexing (TDM) mode, a frequency-division multiplexing (FDM) mode, or a spatial-division multiplexing (SDM) mode, and the use case comprises at least an enhanced mobile broadband (eMBB) use case, or an ultra-reliable low-latency communication (URLLC) use case.

13. The method of claim 11, wherein the at least one resource comprises at least one of a set of spatial resources, a set of frequency resources, or a set of temporal resources.

14. The method of claim 11, wherein the at least one resource is further based on at least one of the at least two or more criteria associated with at least one of the two or more beam pairs between the base station and the UE included in the joint channel.

15. The method of claim 14, wherein the at least two or more criteria are each based on at least one of a capacity associated with the joint channel, mutual information associated with the joint channel, a reference signal receive power (RSRP) associated with the at least one of the two or more beam pairs, a signal-to-interference-plus-noise ratio (SINR) associated with the at least one of the two or more beam pairs, or a beam separation associated with the two or more beam pairs.

16. The method of claim 11, wherein the information indicating the at least one operational mode comprises a respective value of each of a set of radio resource control (RRC) parameters.

17. The method of claim 16, wherein the respective values of the set of RRC parameters comprises at least one of a number of transmission configuration indication (TCI) states, a number of code-division multiplexing (CDM) groups, a repetition number associated with an ultra-reliable low-latency communication (URLLC) use case, or a configuration for a scheme enabler associated with the URLLC use case.

18. The method of claim 11, further comprising:
configuring, based on the group-based report, communication with the UE on the joint channel using the at least one resource; and communicating with the UE on the joint channel based on configuring the communication with the UE on the joint channel using the at least one resource.

19. An apparatus for wireless communication at a user equipment (UE), comprising:
a memory; and
at least one processor coupled to the memory and configured to:
determine at least one operational mode including at least a multiplexing mode and a use case associated with communication with a base station on a joint channel that includes two or more beam pairs between the apparatus and the base station;
determine at least one resource associated with the communication with the base station on the joint channel based on the at least one operational mode and at least two or more criteria associated with at least one of the two or more beam pairs between the UE and the base station included in the joint channel, wherein the at least two or more criteria are each different criteria; and
transmit, to the base station, a group-based report associated with the joint channel, the group-based report including information indicating the at least one resource and the at least two or more criteria.

20. The apparatus of claim 19, wherein the multiplexing mode comprises at least a time-division multiplexing (TDM) mode, a frequency-division multiplexing (FDM) mode, or a spatial-division multiplexing (SDM) mode, and the use case comprises at least an enhanced mobile broadband (eMBB) use case, or an ultra-reliable low-latency communication (URLLC) use case.

21. The apparatus of claim 19, wherein the at least one resource comprises at least one of a set of spatial resources, a set of frequency resources, or a set of temporal resources.

22. The apparatus of claim 19, wherein the at least one resource is determined further based on at least one of the at least two or more criteria associated with at least one of the two or more beam pairs between the apparatus and the base station included in the joint channel, and wherein the at least two or more criteria are each based on at least one of a capacity associated with the joint channel, mutual information associated with the joint channel, a spectral efficiency associated with the joint channel, a reference signal receive power (RSRP) associated with the at least one of the two or more beam pairs, a signal-to-interference-plus-noise ratio (SINR) associated with the at least one of the two or more beam pairs, or a beam separation associated with the two or more beam pairs.

23. An apparatus for wireless communication at a base station, comprising:
a memory; and
at least one processor coupled to the memory and configured to:
determine at least one operational mode including at least a multiplexing mode and a use case associated with communication with a user equipment (UE) on a joint channel that includes two or more beam pairs between the apparatus and the UE;
transmit, to the UE, information indicating the at least one operational mode and at least two or more criteria associated with at least one of the two or more beam pairs between the UE and the base station included in the joint channel, wherein the at least two or more criteria are each different criteria; and
receive, from the UE, a group-based report including at least one resource associated with the joint channel based on the at least one operational mode and at least two or more criteria.

24. The apparatus of claim 23, wherein the multiplexing mode comprises at least one of a time-division multiplexing (TDM) mode, a frequency-division multiplexing (FDM) mode, a spatial-division multiplexing (SDM) mode, and the use case comprises at least one of an enhanced mobile broadband (eMBB) use case, or an ultra-reliable low-latency communication (URLLC) use case.

25. The apparatus of claim 23, wherein the at least one resource comprises at least one of a set of spatial resources, a set of frequency resources, or a set of temporal resources.

* * * * *